United States Patent [19]
Carter

[11] 3,949,208
[45] Apr. 6, 1976

[54] APPARATUS FOR DETECTING AND CORRECTING ERRORS IN AN ENCODED MEMORY WORD

[75] Inventor: William Caswell Carter, Woodbury, Conn.

[73] Assignee: International Business Machines Corporation, Armonk, N.Y.

[22] Filed: Dec. 31, 1974

[21] Appl. No.: 537,806

[52] U.S. Cl. ............... 235/153 AM; 340/146.1 AL
[51] Int. Cl.² ......................................... G06F 11/12
[58] Field of Search ............ 235/153 AE, 153 AM; 340/146.1 AL, 146.1 AE, 146.1 AX

[56] References Cited
UNITED STATES PATENTS

| | | | |
|---|---|---|---|
| 3,568,153 | 3/1971 | Kurtz | 235/153 AM |
| 3,648,239 | 3/1972 | Carter et al. | 340/146.1 AL |
| 3,668,631 | 6/1972 | Griffith et al. | 340/146.1 AX |
| 3,678,469 | 7/1972 | Freeman et al. | 340/146.1 AL |
| 3,688,265 | 8/1972 | Carter et al. | 340/146.1 AL |
| 3,714,629 | 1/1973 | Hong et al. | 340/146.1 AL |
| 3,755,779 | 8/1973 | Price | 340/146.1 AL |
| 3,836,957 | 9/1974 | Duke et al. | 340/146.1 AL |

*Primary Examiner*—Charles E. Atkinson
*Attorney, Agent, or Firm*—Robert E. Sandt

[57] ABSTRACT

Apparatus for a digital memory system which performs single and double error detection and correction, as well as the detection of faults in the memory storage elements which do not produce errors in the data word stored therein. The data word is encoded in a specialized Hamming SEC/DED code and the apparatus generates syndromes and byte parity bits which are analyzed to detect both the presence and nature of the errors and faults. A parallel correction procedure is followed and the results thereof compared to prevent the erroneous correction of errors.

17 Claims, 18 Drawing Figures

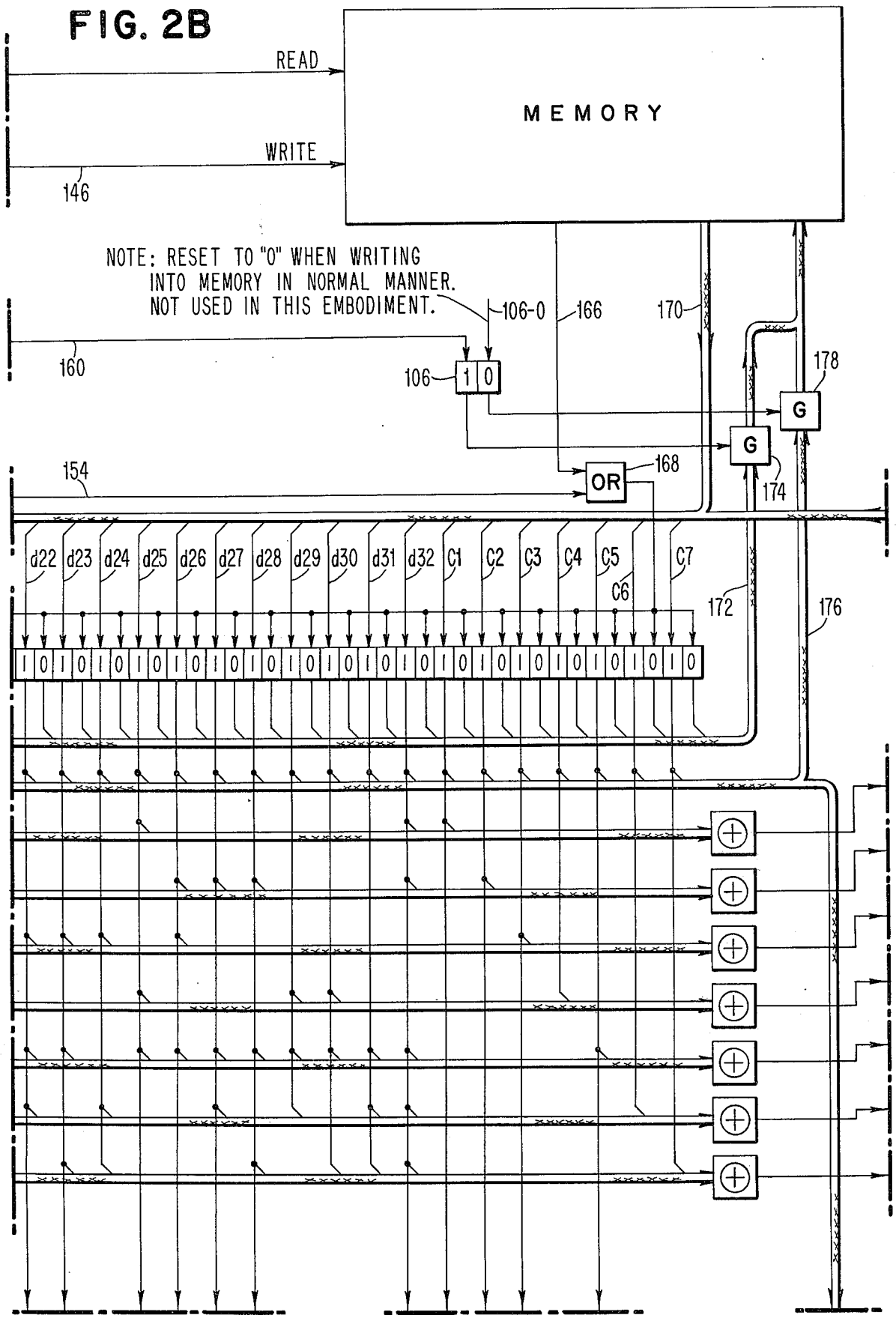

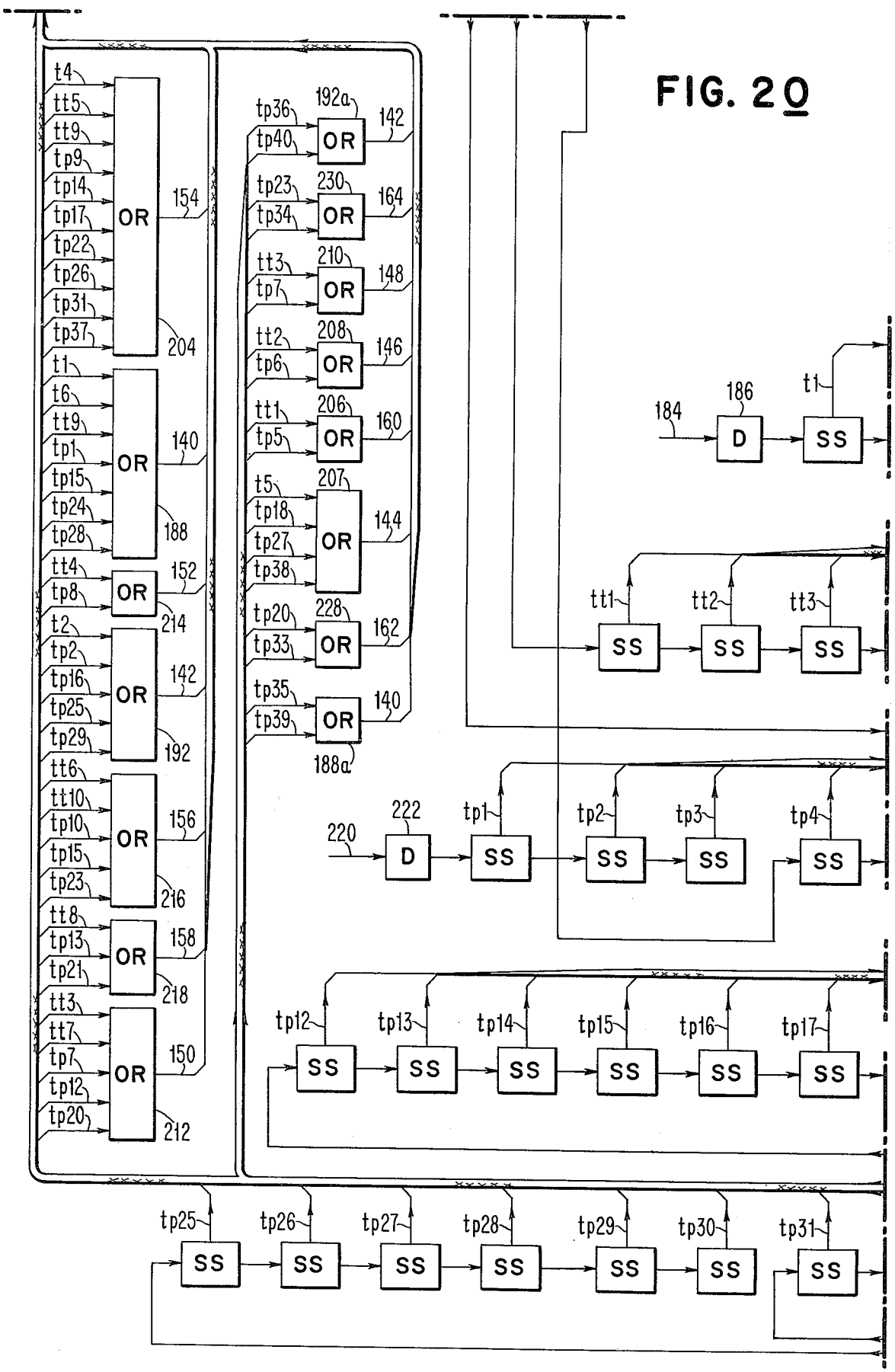

APPARATUS FOR DETECTING AND CORRECTING ERRORS IN AN ENCODED MEMORY WORD

BACKGROUND OF THE INVENTION

The present invention relates to an apparatus for checking and correcting errors in a memory word consisting of information bits and check bits encoded in a specially structured code. More specifically it relates to apparatus for detecting and correcting single and double errors in a data word, detecting greater than two errors and checking the operations of the apparatus itself for component faults.

It is axiomatic that data entering a data processor, whether it originates in a local memory, or is received from a remote source via a communication link, must be correct. For this reason many error detecting and error correcting codes have been evolved to insure the integrity of the information to be processed. Generic to all of these codes is redundancy, wherein additional bits are added to the information bits as a function thereof to permit the algorithm controlling the check bits to be recomputed at the destination for error detection and possible correction, if the code is sufficiently sophisticated.

One class of codes, known as single error correction, double error detection (SEC/DED) is described by R. W. Hamming in "Error Detecting and Error Correcting Codes", *Bell Systems Technical Journal*, 29, 1950, pages 147–160. The instant code is a properly chosen variation of that code.

U.S. Pat. No. 3,688,265 issued Aug. 29, 1972 to W. C. Canter et al. discloses a self-checking memory translation system employing a Hamming SEC/DED code.

Another class of codes is the Bose Chaudhuri code and variations thereof by Golay and by Hocquenghem. Examples of these and apparatus for exploiting their error correction capabilities are exemplified in U.S. Pat. No. 3,622,982 issued Nov. 23, 1971 to B. S. Clark Jr. et al., by U.S. Pat. No. 3,418,629 issued Dec. 24, 1968 to R. T. Chien, and by U.S. Pat. No. 3,685,014 issued Aug. 15, 1972 to My-Yue Hsiao et al.

Error correcting code theory and applications are treated in the text "Error Correcting Codes" by W. W. Peterson, published by M. I. T. Press and John Wiley and Sons Inc., 1961.

The correction capabilities of any code is dependent upon redundancy. In the simplest case of a single parity bit, there are no correction possibilities. In fact, two compensating errors will not be detected, as the parity is unchanged. In U.S. Pat. No. 3,622,982, supra, the Golay code employs 12 data bits and 11 check bits for the correction of triple errors. This is a very large redundancy.

SUMMARY OF THE INVENTION

In the instant invention the chosen code is a variation of the Hamming SEC/DED which is defined as having a parity check matrix (PCM) in which each column thereof has an odd number of 1's, and each row has the same number of 1's modulo 2. Such a matrix can always be devised for a byte oriented computer word. In a code of this nature the check bits for the information bits and their complements have a well defined relationship. If the number of 1's in each row of the PCM is odd (an even number of 1's for the data bits, and a single 1 for the check bit), then the check bits for the complemented data bits are the same. If the number of 1's is even the check bits are complementary.

An error in a binary datum bit is the reversal of state of that bit from its intended or correct state. A fault is the failure of a storage element or circuit component to perform its intended function properly.

Not every fault produces an error. For example, if a storage element were stuck at zero and the datum bit to be stored in that position were intended to be a zero, then there would be no datum error in that position. This would be a datum compatible fault for that word, and any other word having a zero in that bit position.

Storage elements in a memory can be considered to be operating properly, to be stuck at 0 (S-A-0) or stuck at 1 (S-A-1). The stuck positions are faults in the memory, which may not cause corresponding errors in the data word. The instant invention seeks to detect and correct errors which are beyond the usual correction ability of such a code and apparatus.

The detection and correction is divided into two procedures, both of which employ the same apparatus used in different sequences and combinations. The first procedure is short, and corrects single errors independent of the number of faults, double errors caused by just two faults, as well as detection of errors uncorrectable by this simplified procedure. The second procedure is more lengthy and more powerful.

It is therefore an object of this invention to provide apparatus for testing an encoded data word stored in a fault-prone memory, to detect faults in the memory, to detect errors in the data word caused by faults in the memory, to correct certain of those errors, to prevent the miscorrection of errors, and to detect faults in the error detection and correction apparatus.

It is another object to provide an error correcting apparatus employing two channels of correction apparatus utilizing different sequences of operations and for comparing the words as sought to be corrected in each of the channels and utilizing only those words which produce identical results in both channels.

It is another object to provide testing means for testing the original word, the word as finally sought to be corrected and all intervening words derived from the processing of the original data word, to prevent use of miscorrected words, to stop the error correction attempt when uncorrectible words are found, and to alter the sequence of correction operations in response to the results of the tests.

It is another object to implement the foregoing functions for data words encoded in a Hamming SEC/DED code whose parity check matrix is characterized by having an odd number of ones in each column and the same number of ones modulo two in each row.

The foregoing and other objects, features, and advantages of the invention will be apparent from the following more particular description of preferred embodiment as illustrated in the accompanying drawings of which;

Figures 2, 2A:
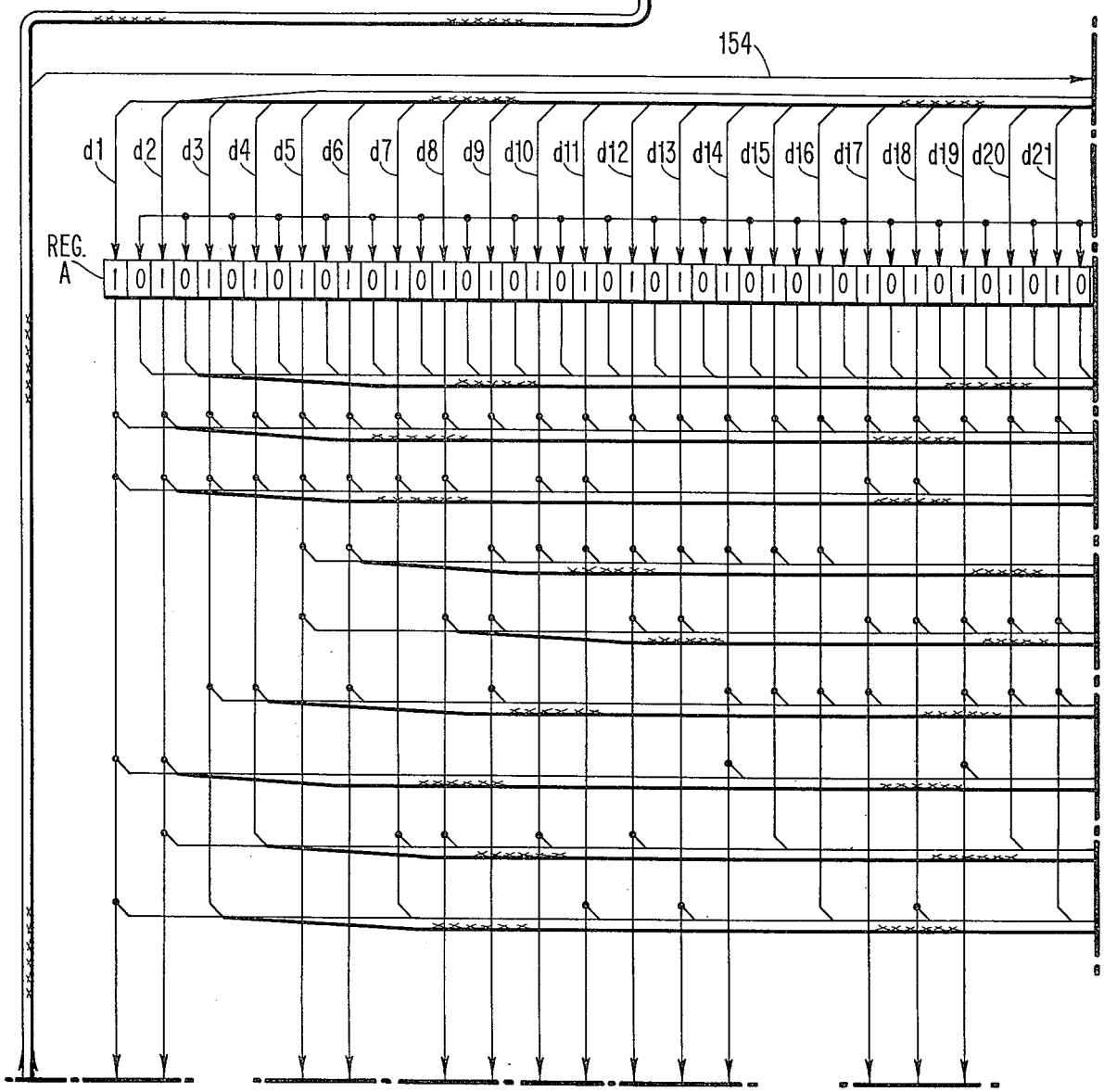
FIG. 2 shows the arrangement in which the separate sheets containing FIG. 2A to 2P should be joined.
Figure 2C:
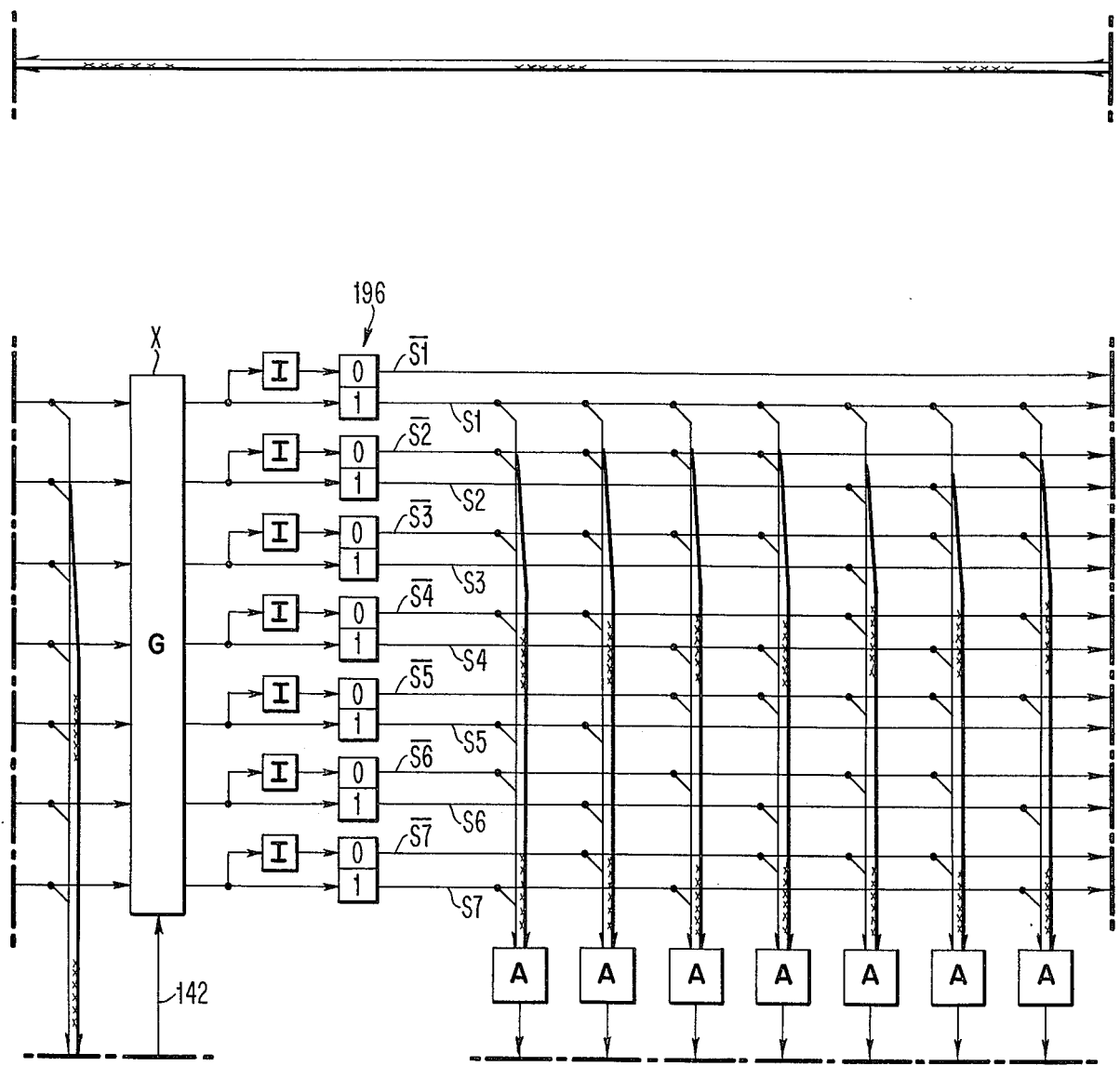
Figure 2D:
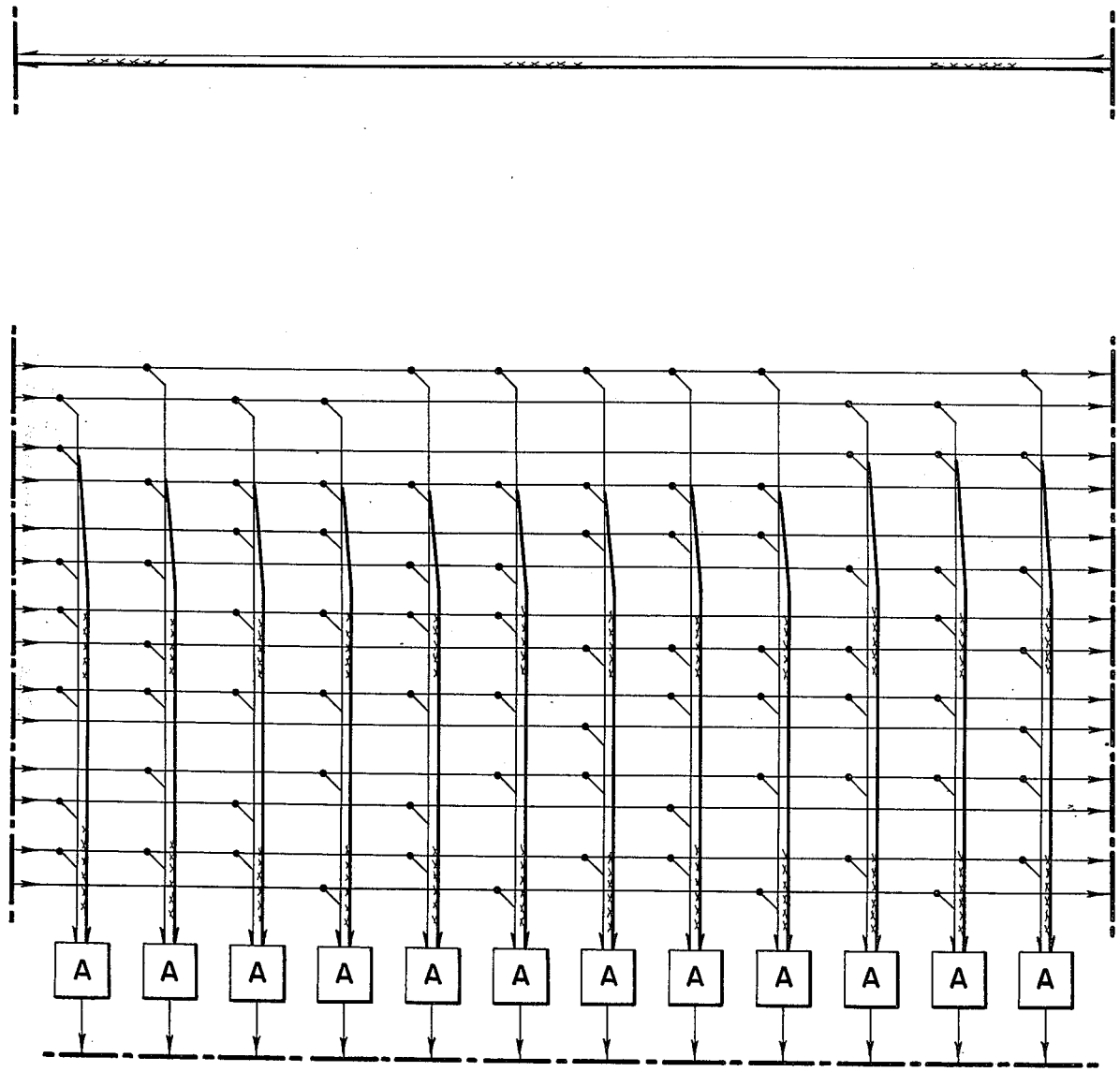
Figure 2E:
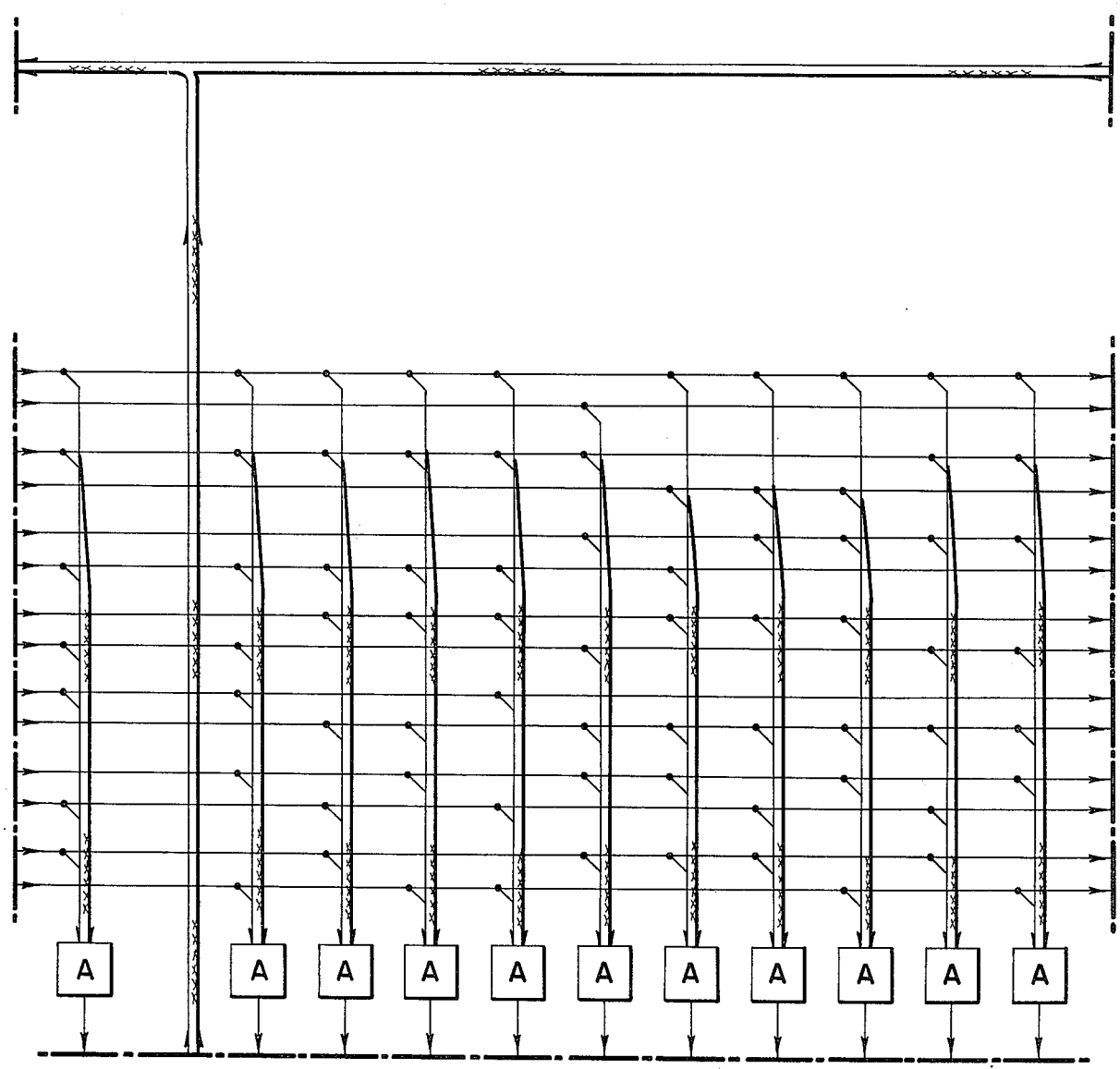
Figure 2F:
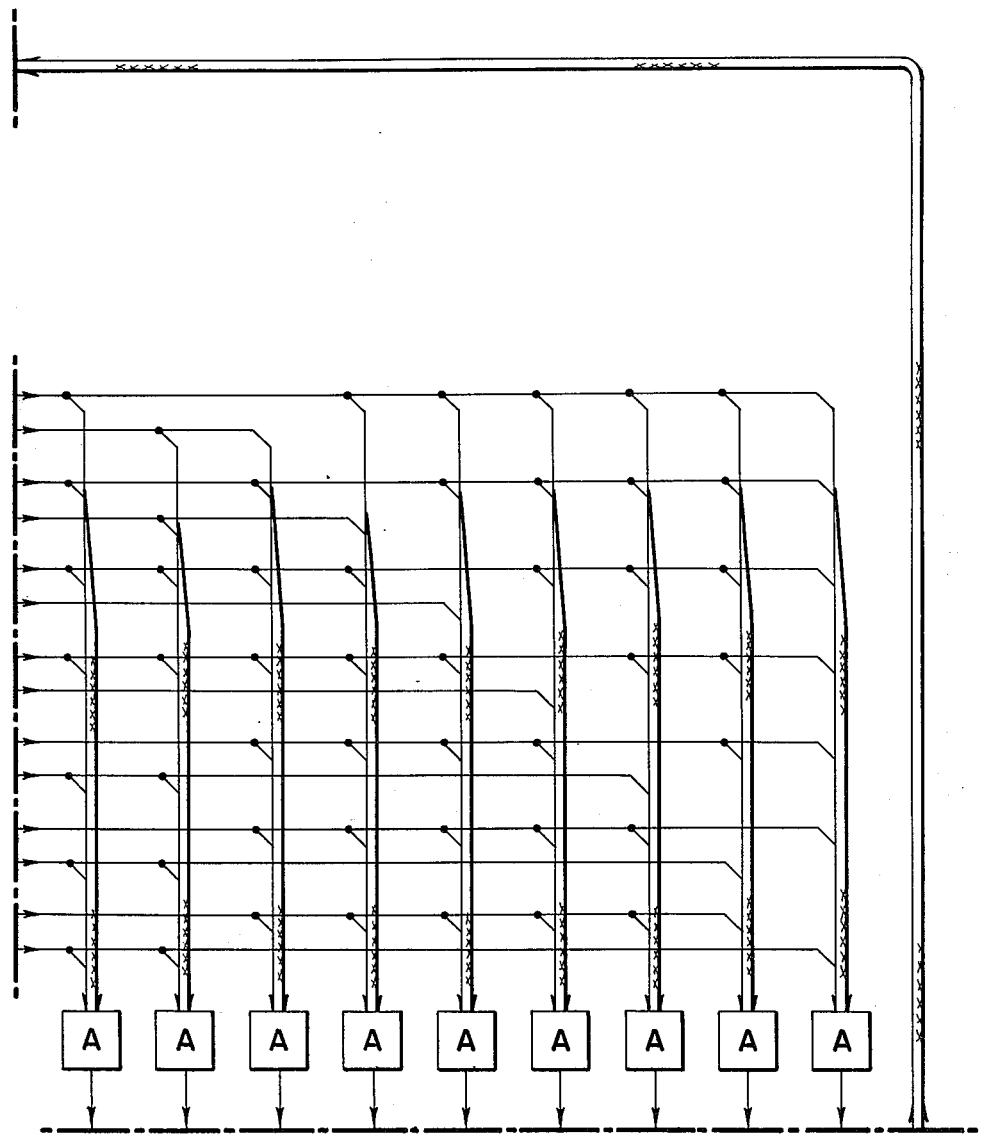
Figure 2G:
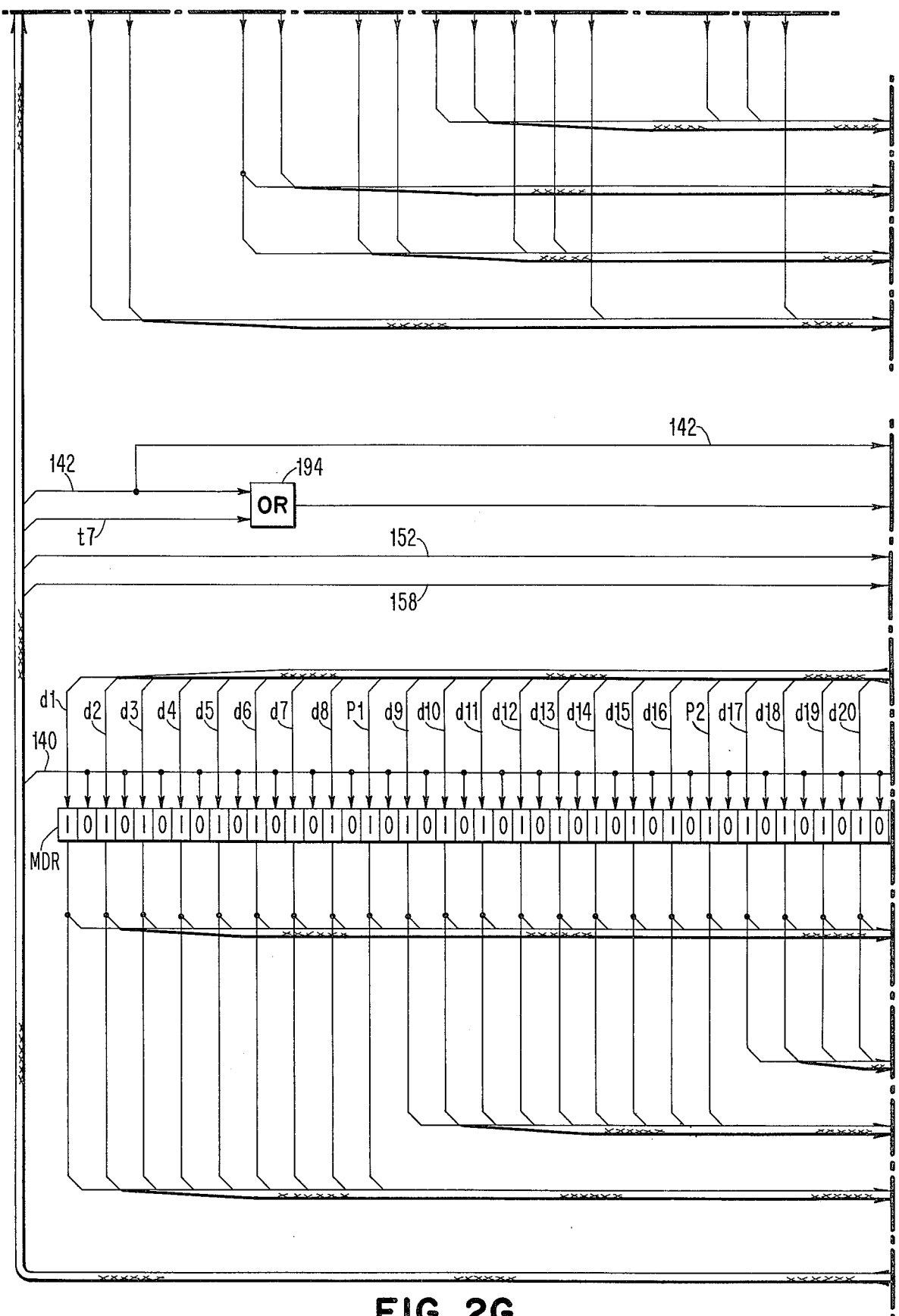
Figure 2H:
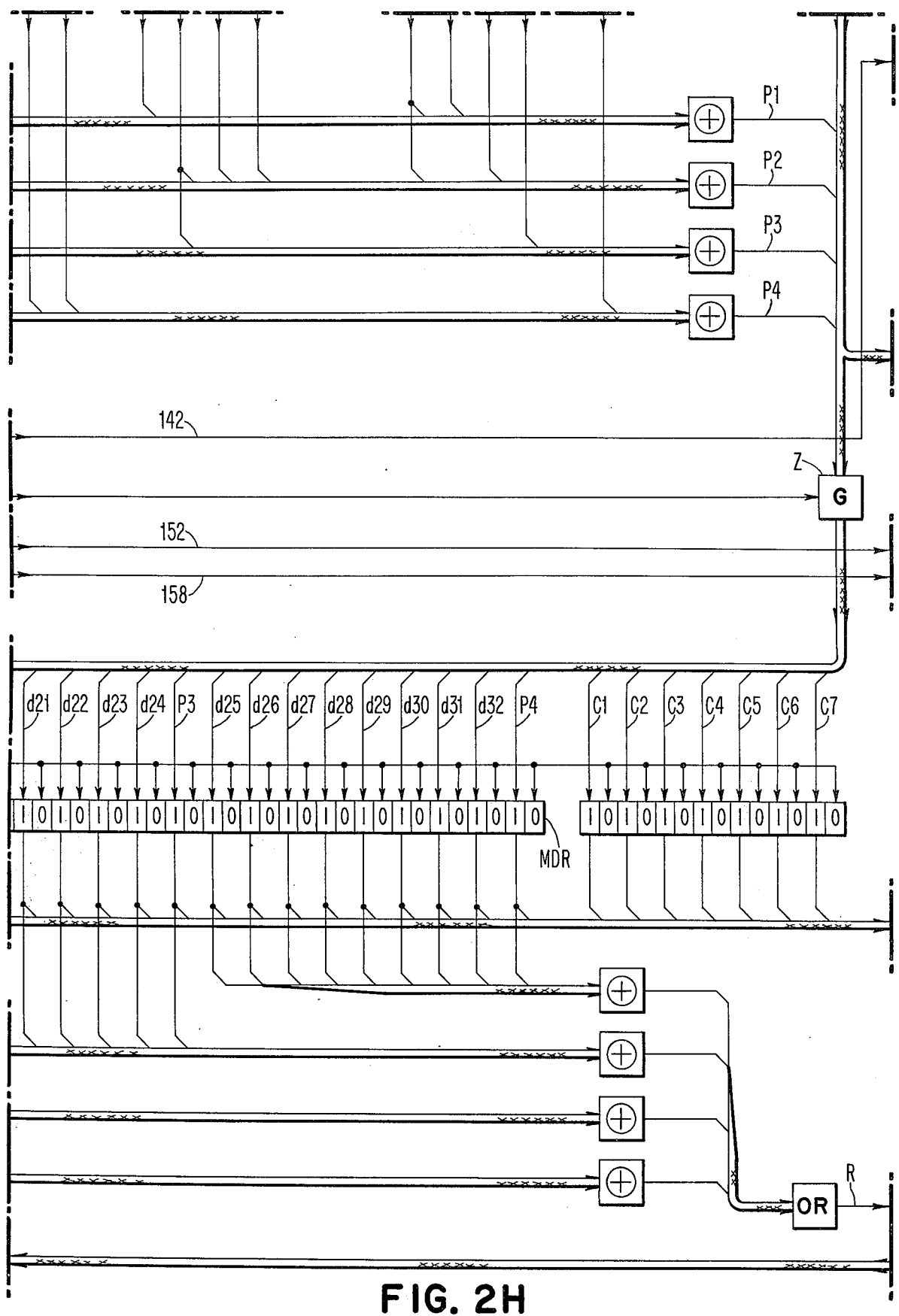
Figure 2I:
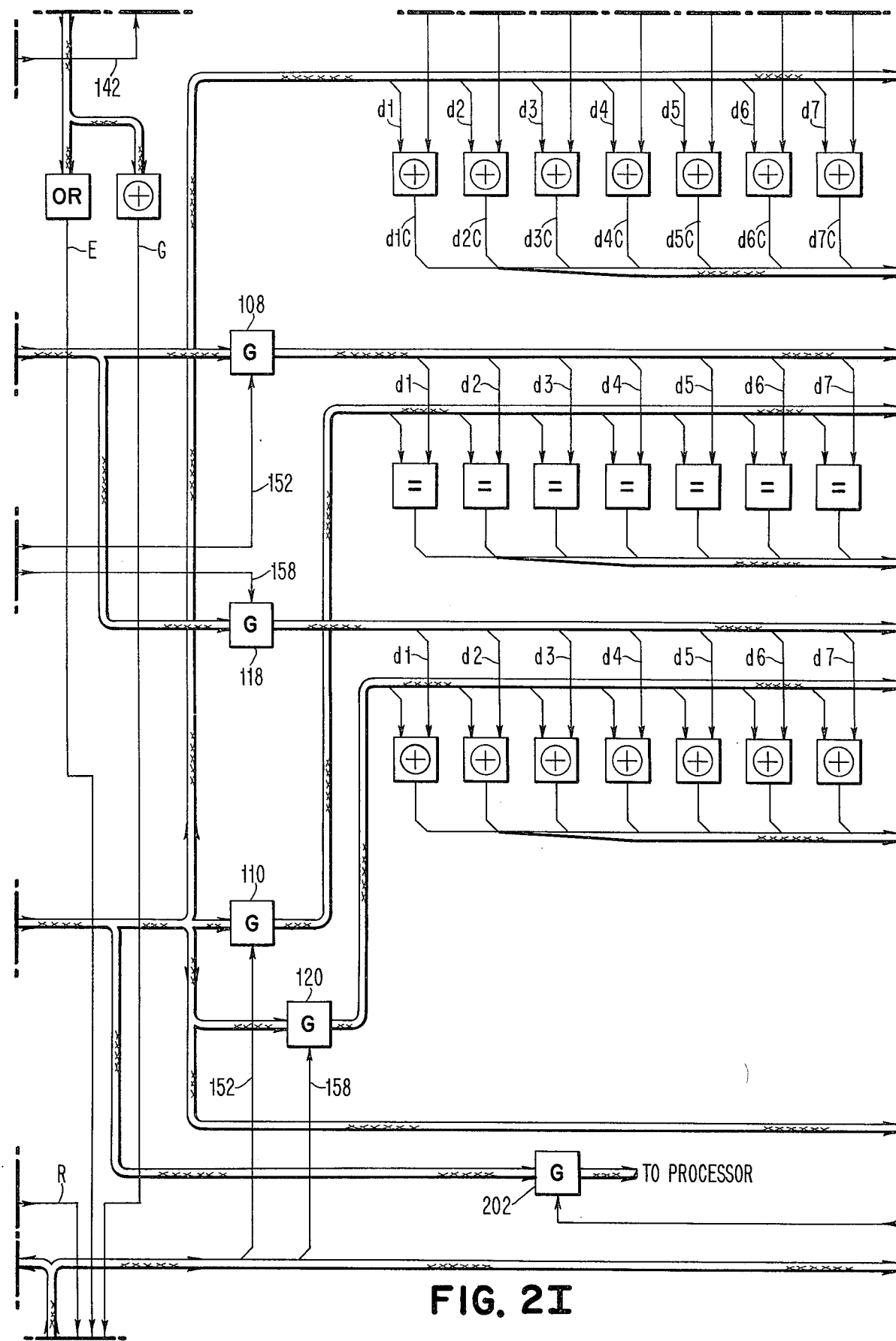
Figure 2J:
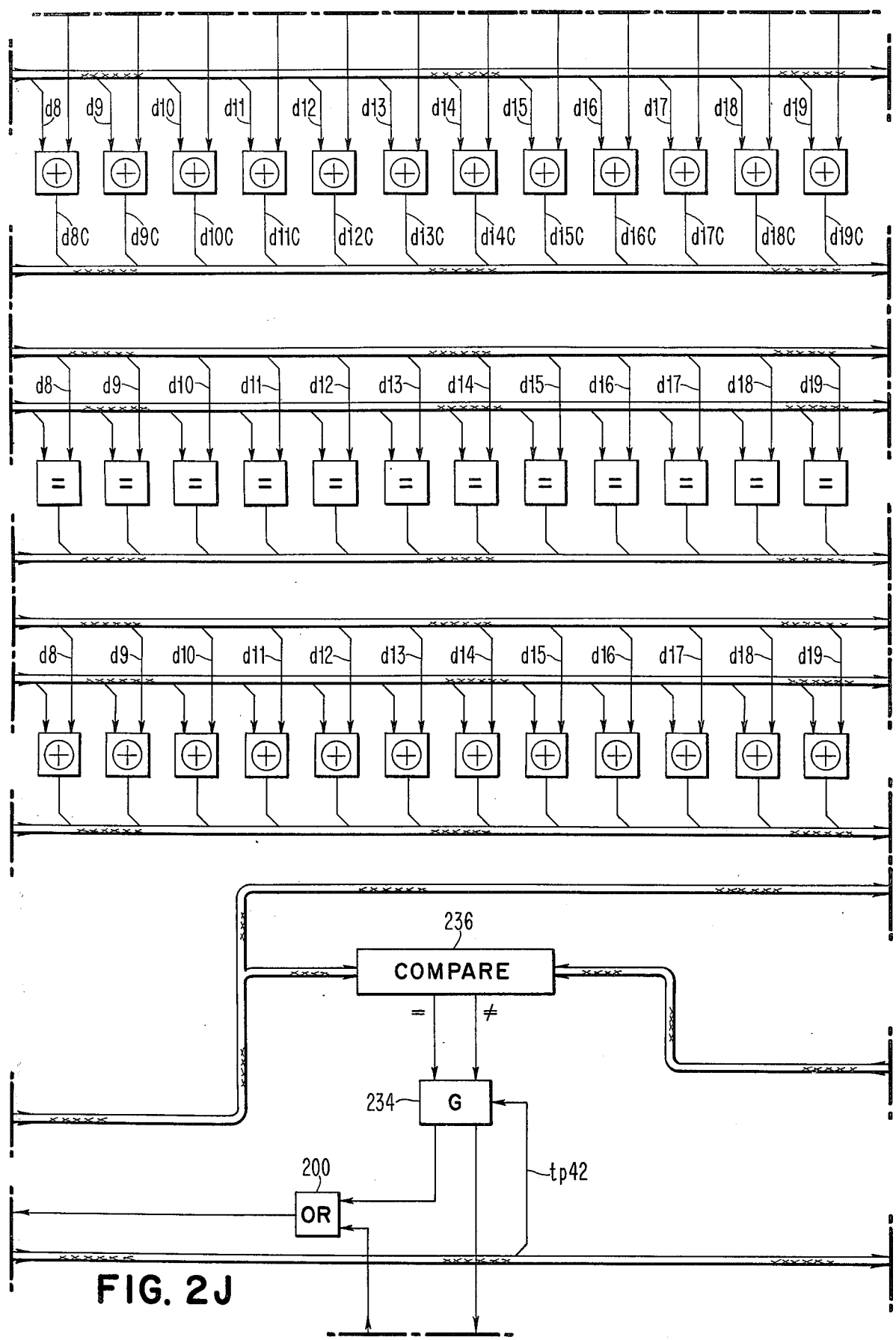
Figure 2K:
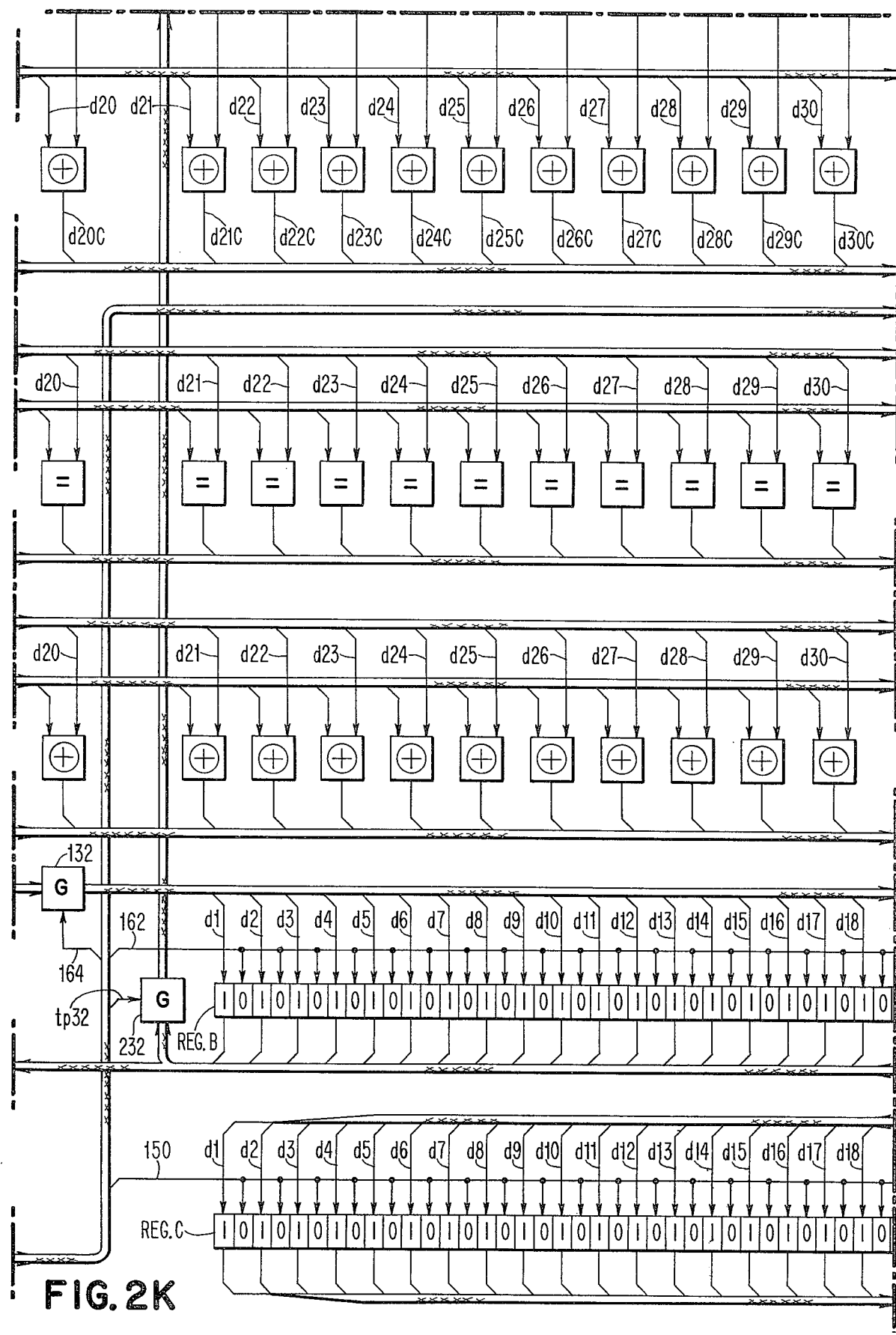
Figure 2L:
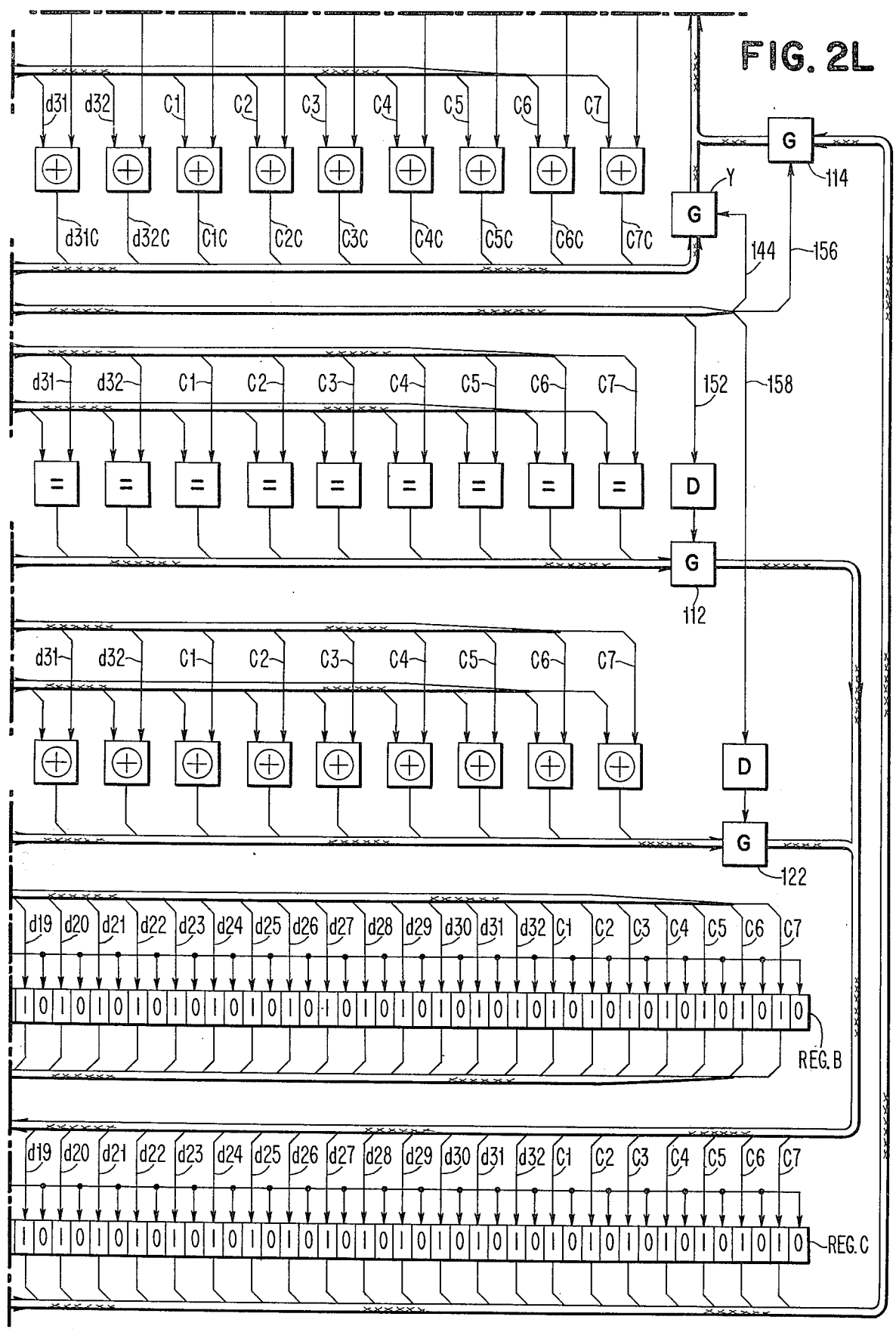
Figure 2M:
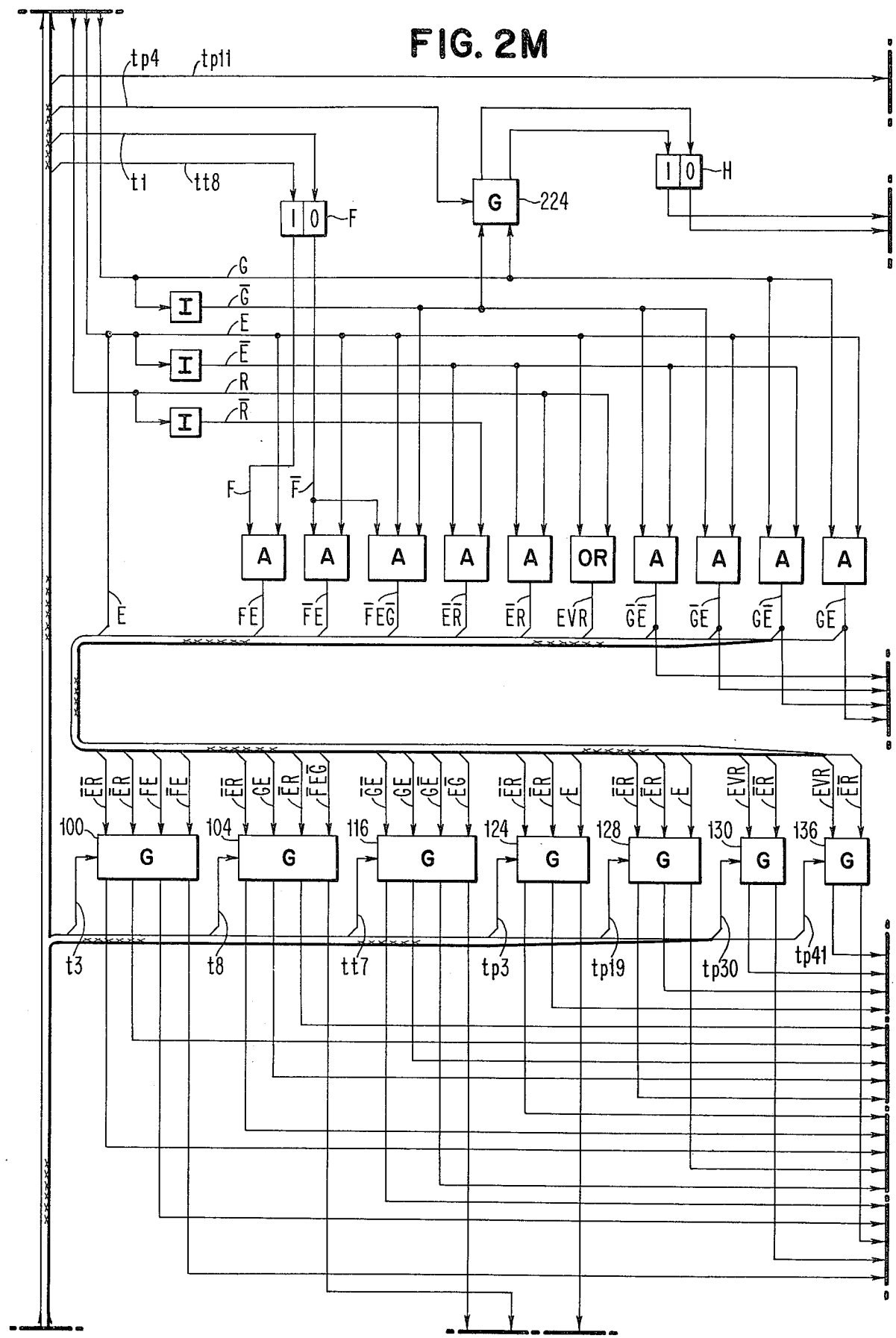
Figure 2N:
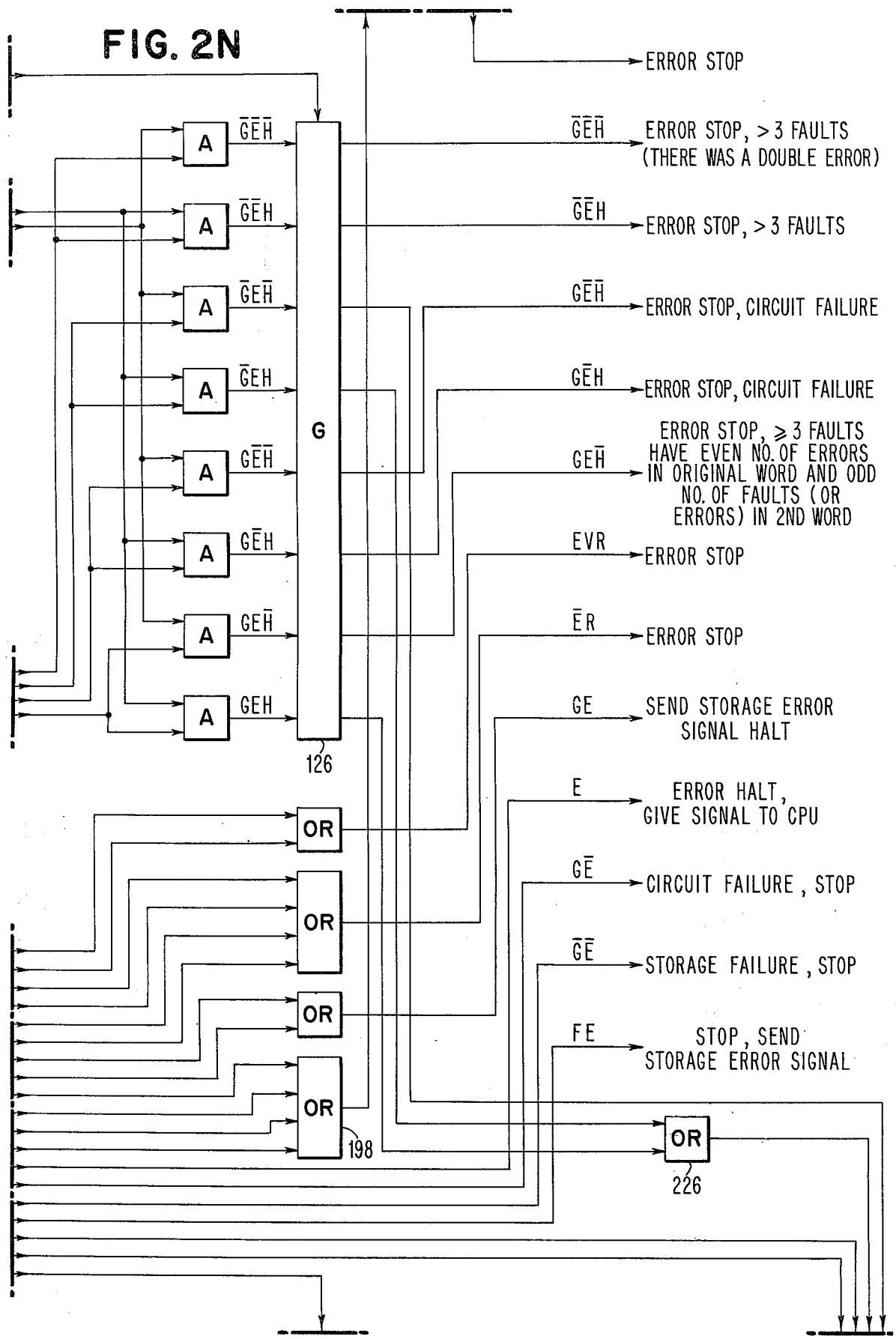
Figure 2P:
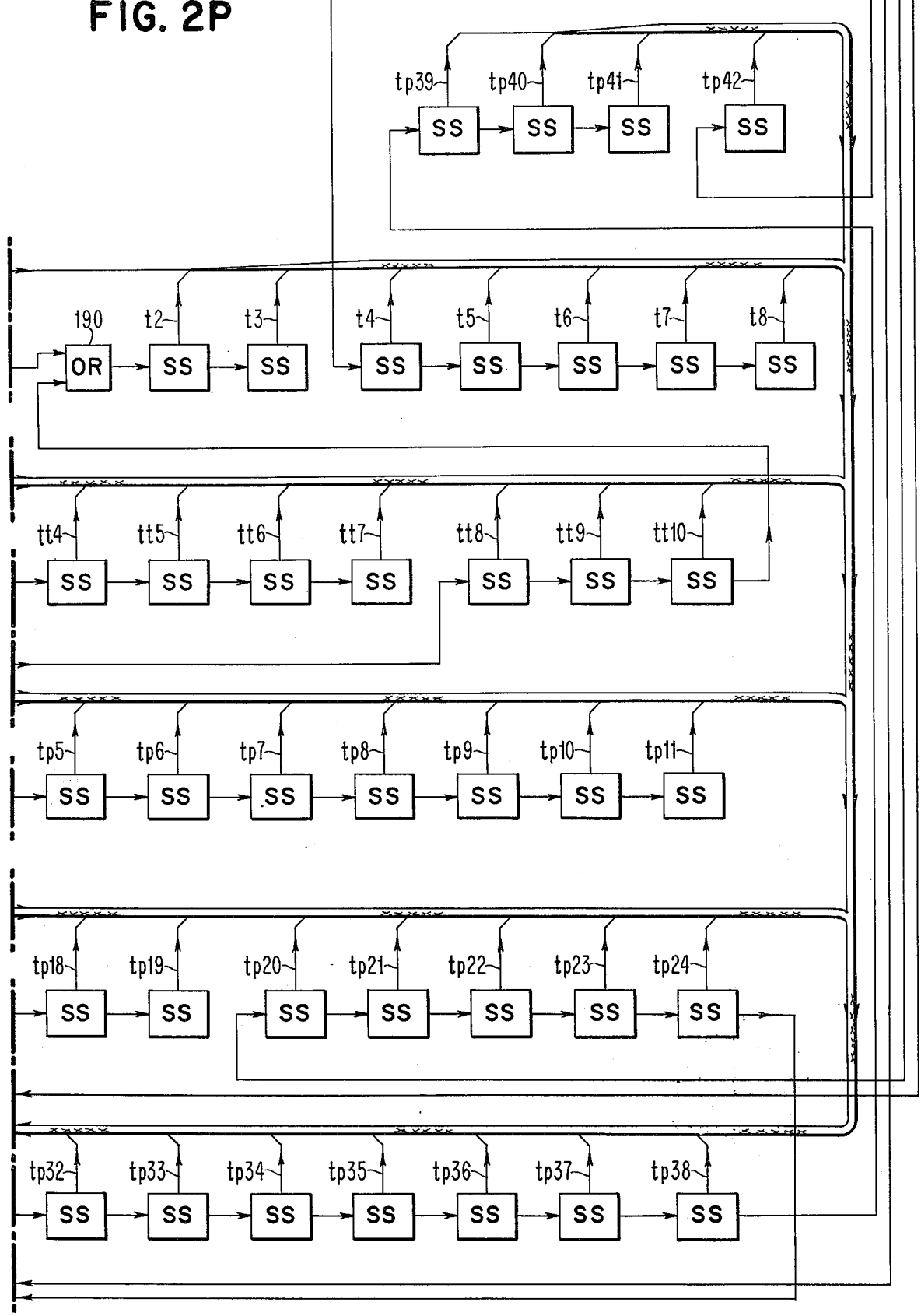

FIGS. 2A through 2P contain the detailed logic and operational elements of the invention.

The detection and correction is premised on the following theorems.

THEOREM 1.

If all the failures in storage bit positions are stuck at $\alpha$, $\alpha \in \{0,1\}$ ($s$-$a$-$\alpha$), then all faulty bit positions in a storage location can be located.

Let the original data word be $W = a_i \, i = 1, \ldots, N$, and the word in storage, $W_s$ be represented by $W_s = a_i \, b_j \, c_l \, i = 1, \ldots, I \, j = 1, \ldots, J, \, l = 1, \ldots, L, \, I + J + L = N$ where the $a_i$ have no faults, $b_j$ are $s$-$a$-$o$ and the $c_l$ are $s$-$a$-$1$.

Read $W_s$ from storage and put it in a register. Complement the bits of $W_s$ to form $\overline{W}_s = \overline{a}_i \, \overline{b}_j \, \overline{c}_l$, and store $W_s$ in the same storage location. The word in storage is $$(\overline{W}_s)_s = \overline{a}_i \, b_j \, c_l$$

since $b_j, c_l$ are $s$-$a$-$\alpha$ (0,1 respectively). Read $(\overline{W}_s)_s$ from storage and form the N bit logic function ($W_s = (\overline{W}_s)_s) = 0, \ldots, 0, 1, \ldots, 1, 1, \ldots, 1$ with I 0's ($a_i \neq \overline{a}_i$) and $J + L$ 1's ($b_j = b_j, c_l = c_l$). The faulty locations in the storage word are shown by the positions of the 1's in the N bit logic function.

Corollary.

The number of stuck faults in a storage location detected by this procedure is $\geq$ the number of errors detected while using that location.

Proof.

Storing $\alpha$ and $s$-$a$-$\alpha$ produces no error in $W_s$, but in the procedure both $\alpha$ and $\overline{\alpha}$ are stored in each location.

The next theorem shows the correction abilities of a storage system.

THEOREM 2.

If a storage system detects all combinations of $< t$ single bit errors, and indicates that $t_1 \leq t$ errors have occurred when a word is read, then any combination of exactly $t_1$ faults in a storage word can be corrected.

Let the correct word be $W = a_i, i = 1, \ldots, N$. Write W in storage. The word in storage is $W_s = a_i \, b_j \, c_l, \, i=1, \ldots, I, j = 1, \ldots, J, l, \ldots, L$ with $I + J + L = N$ and $J + L \leq t$ (from the theorem hypothesis).

Attempt to read W from storage. The word read is $W_s$ with an error indication of $t_1$ errors (theorem hypothesis). Follow the procedures of Theorem 1, put $W_s$ in a register, form $\overline{W}_s$, put $\overline{W}_s$ in storage to obtain $\overline{W}_{ss}$ and form the N bit logic function $$(W_s = \overline{W}_{ss}) = 0, \ldots, 0, 1, \ldots, 1, 1, \ldots, 1$$
$$\text{I} \quad \text{J} \quad \text{L}$$

since $J + L$ represent all the stuck faults in this storage word, $J + L \geq t_1$ since $t_1$ errors were signalled. If $J + L = t_1$, then the erroneous locations have been found, each fault has produced an error, and $$W = W_s \oplus (W_s = \overline{W}_{ss}) = (\overline{W}_{ss})$$

If $J + L = t_1 + \alpha$, $\alpha > o$ then corrections cannot be made. In this case one of the $$\binom{t_1 + \alpha}{t_1}$$

combinations of $t_1$ errors from $t$ faults has occurred and determining which error pattern has occurred is impossible without more information.

These procedures can be used with a wrap-around storage corrector/translator and a properly chosen Hamming SEC/DED code, Double Error (DE), Single Error (SE) and Error (E) signals to provide single error correction regardless of the number of storage faults in a word, correction of the errors resulting from double faults in a word, detection of most triple faults which cause DE signals, (if these faults cause triple errors, some errors will be erroneously corrected) detection of multiple errors which cause word patterns distinct from single error code space, and a fault secure correction/translator.

The corrector/translator operates as follows. A word is read from storage, the data bits are put into the Memory Data Register (MDR) and the SEC/DED check bits are used to generate byte parity bits and these are checked simultaneously with syndrome generation. After syndrome generation E is generated as the OR of the syndrome signals (using even parity) and DE is generated as the parity of the syndrome signals. (The effect of quadruple etc. errors will be neglected). If $DE = 1$, the word will be stored in an auxiliary register (with correct parity) and the Double Error recovery program, DEP, called. If $SE = E \wedge \overline{DE} = 1$, and the signal action is not inhibited, correction will take place. After this correction, if $E = 1$, the signal $E \wedge \overline{DE}$ is inhibited (a non-correctable word has been found) and a non-correctable storage error is signaled. $SE = E \wedge \overline{DE}$ may also be inhibited by instructions in the DEP procedure.

The particular Hamming SEC/DED code defined by a parity check matrix (PCM) in which each column has an odd number of 1's (the check digits have one) and each row has the same of number of 1's modulo 2. This is true for the "standard" (72,64) code or many rotational codes. Such a matrix can always be devised for a byte oriented computer. One for the (39,32) code is attached. In such codes the check bits for W and $\overline{W}$ have a well defined relationship. If the number of 1's in each row of the PCM is odd, (an even number of 1's for the data bits), then the check bits for W and $\overline{W}$ are the same; if the number of 1's is even, then the check bits for W and $\overline{W}$ are complementary.

The basic idea behind the recovery procedure is the following. Read storage location A, get $W_s = a_i \, b_j \, c_l$ (using the previous notation). If ($DE=0$), proceed as usual in the no-error, single error or non code word cases. If $DE=1$, store $W_s$ for future use, complement $W_s$ bitwise to get $\overline{W}_s = \overline{a}_i \, \overline{c}_l$ and store $\overline{W}_s$ in location A. Read $(\overline{W}_s)_s = a_i b_j c_l$ (as before). Now correct $W_s$ in two ways, (1) by forming $(\overline{W}_s)_s$ and (2) by correction using the correction circuits. By examining these two possible correction words and the error signals determine if a valid correction is possible.

To recapitulate, component faults in one word are treated with this memory encoding and recovery program. No fault situations are no problem. Single faults result in 0 or 1 error and are corrected automatically. Two faults may produce 0 or 1 error which is corrected automatically, or double errors which can always be corrected using this recovery procedure. Three faults may produce 0 or 1 error with no problems. If double or triple errors are encountered, then A% and B% respectively are miscorrected and (1-A)% and (1-B)% are identified as triple faults which require rollback. A and B can be calculated for specific situations, but in any case $A < B$ (and triple faults are 3 times as likely to cause double errors as triple errors).

THE SPECIFIC CODE EMPLOYED

The code employed in the preferred embodiment is a properly chosen Hamming SEC/DED code which is defined as having a parity check matrix in which each column has an odd number of 1's, each row has the same number of 1's modulo 2, and each of the check bits has a single 1 in each respective column.

The general expression for the instant code which relates the number of check bits K and information bits M is as follows:

| K | M |
|---|---|
| if K = odd | $M = 2^{K-1} - K - 1$ |
| if K = 2 × an odd number | $M = 2^{K-1} - K - 2$ |
| if K = 4 × any number | $M = 2^{K-1} - K - 2$ | where
K = number of check bits
M = number of information bits

In the code chosen for this embodiment K=7 and M=32. While in the foregoing relationships the seven check bits would support 56 information bits as a maximum, the choice of 32 information bits has been chosen to be compatible with a standard byte-oriented memory word.

The error detecting and correcting apparatus to be described generates and logically exploits the following error symbols:

P = a byte parity bit
R = the logical OR of the byte parity checks
S = a syndrome, the parity of predetermined combinations of information and check bits
E = the logical OR of the syndromes
G = the parity of the syndromes The foregoing derived terms will be either binary zeros or binary ones. They are used to check the validity of the word as read from memory, to analyze the character of the errors in the data word, the faults in the memory, and to check the operation of the detection and correction circuitry.

In the code chosen for this embodiment R, E, and G will all be zeros for an error-free word. For an error, or errors, E will be non-zero. An odd number of errors, other than compensating errors, will produce an odd byte parity (R) and odd syndrome parity (G).

The parity check matrix is constructed to conform to the following logic equations:

$P_1 = d_{10} \theta d_{11} \theta d_{17} \theta d_{18} \theta d_{25} \theta d_{32} \theta C_1$
$P_2 = 5 \theta 6 \theta 26 \theta 27 \theta 28 \theta 32 \theta C_2$ (5 stands for $d_5$ etc.)
$P_3 = 5 \theta 8 \theta 9 \theta 12 \theta 13 \theta 26 \theta C_3$
$P_4 = 10 \theta 14 \theta 19 \theta 22 \theta 23 \theta C_5$ $S_1 = P_1 \theta \overset{8}{\underset{1}{\Psi}} d_i$ (Mod 2 Sum of $P_1$ and $d_1$ through $d_8$)

$S_1 = P_2 \theta \overset{16}{\underset{9}{\Psi}} d_i$ (Mod 2 Sum of $P_2$ and through $d_{16}$)

$S_3 = P_3 \theta \overset{24}{\underset{17}{\Psi}} d_i$ (Mod 2 Sum of $P_3$ and $d_{17}$ through $d_{24}$ $S_4 = \Psi 3, 4, 6, 9, 14, 15, 16, 17, 19, 20, 21, 25, 29, 30, C_4$ $S_5 = P_4 \theta \overset{32}{\underset{25}{\Psi}} d_i$ (Mod 2 Sum of $P_4$ and $d_{25}$ through $d_{32}$)

-continued $S_6 = \Psi 2, 4, 7, 8, 10, 12, 15, 20, 22, 24, 27, 29, 31, 32, C_6$ $S_7 = \Psi 1, 3, 7, 11, 13, 16, 18, 21, 23, 24, 28, 30, 31, 32, C_7$ While casual examination will not reveal it, each information bit, except $d_{32}$ appears three times in the parity check matrix, while $d_{32}$ appears five times to satisfy the requirement of an odd number of 1's in the PCM. Each row contains the same number of 1's namely 15. With this relationship the check bits for the information bits and their complement are identical.

The same obtains for odd and even errors in excess of one and two.

For the correction of single errors the logical AND of those syndromes affected by the digit in error and the not of the unaffected syndromes will provide a one output, which, when exclusively ORed with the digit in error will correct it by complementing it.

For other corrections a comparison of the original data word with its complement in an equals circuit will indicate equality in those bit positions which are permanently struck, for those positions will refuse to be complemented and thus be equal.

SYSTEM CONFIGURATION

Figure 1:
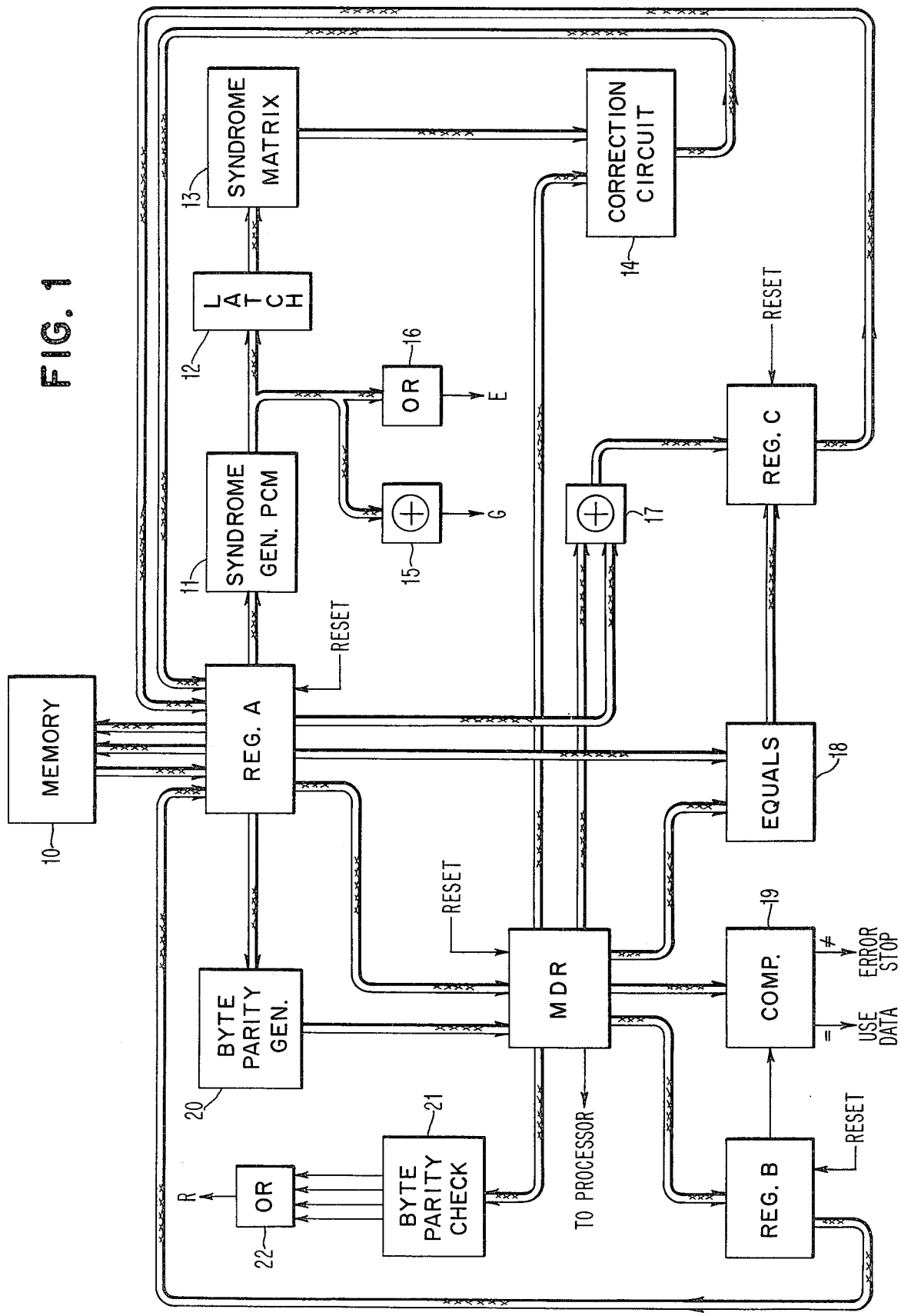
FIG. 1 is a functional block diagram illustrating the path of the processing.

The system configuration is shown in block diagram form in FIG. 1. The double lines connecting the various blocks together with their arrows denote the direction of data flow, and the fact that a multiplicity of lines (usually 39) is included in the connection.

The four registers A, B, C, and MDR are conventional binary units with a master reset and binary one input and output lines, except Register A which has both zero and one outputs for complementing the contents. Not shown in the simplified schematic are the timing pulse generators for ordering the sequential operation of the various functions, gates controlled thereby for controlling the data flow, and the logic gates for testing and controlling the system operation.

Special circuit components include the syndrome generator 11 (PCM) which produces the seven syndromes in accordance with the logic equations hereinabove set forth. Essentially each consists of a tree of fourteen XOR gates which produces a 1 output if there are an odd number of 1's in the 15 inputs or a 0 if an even number of inputs. The inputs are wired to conform to the logic equations supra.

The XOR gate 15 consists of a tree of six individual XOR gates to determine the parity of the syndrome bits, yielding an ouput of G or $\overline{G}$ for odd and even parity respectively. The OR gate 16 yields an output if any one or more of the syndromes is in the 1 state, manifesting an error.

The latch 12 consists of seven binary elements which store the syndromes for future use by the syndrome matrix 13. The syndrome matrix is a 7 × 39 wired matrix with 39 seven input AND gates each receiving combination of the presence and absence of the syndromes such that for each datum and check digit a unique combination of syndromes will be checked conforming to the logic equations set forth above. Essentially each combination assumes a single error in the respective digit and wires the one outputs from those syndromes affected by the error and the zero outputs from those syndromes unaffected by the error. Since all data digits, except $d_{32}$, appear three times in the PCM there will be three presences and four absences in the combinations. Digit $d_{32}$ will have four 1's and three 0's. The check digits, appearing only once in the matrix, will have four 0's and one 1.

The correction circuit 14 consists of thirty nine two input XOR gates, receiving the output of the syndrome matrix 13 and the respective digit from the memory data register (MDR).

The byte parity generator produces the outputs $P_1$, $P_2$, and $P_4$, in the foregoing logic equations. These are related to $S_1$, $S_2$, $S_3$, and $S_5$, respectively. While each of these syndromes includes the parity of an eight bit byte, the byte parity bits utilize the remaining seven bits of the corresponding syndrome.

The byte parity check 21 checks the contents of the MDR utilizing the byte parity bits generated from register A and the data bits in MDR. It consists of four XOR trees each having an eight bit byte and the corresponding byte parity check bits as inputs. The four outputs are ORed in gate 22 to yield on R or $\bar{R}$ output, depending on the parity check.

The XOR gate 17 consists of thirty-nine two input XOR gates with inputs from register A and the MDR for correction purposes. Also used in correction cycles is the equals circuit which compares the word complement in register A with the true word in the MDR and produces a 0 output in the non-comparing orders and conversely. Obviously in a no-fault condition the output will be all zeros.

The final component is the comparator 19. This apparatus can take various forms, but preferably consists of thirty-nine XOR gates and an OR gate connected to the output thereof. If all of the corresponding orders are the same, each XOR gate will yield a 0 output, which, when ORed will yield gross zero output. Any one mismatch will yield a 1 output in its XOR gate and a 1 from the OR gate.

The foregoing components and their sequential operation will be described in detail in connections with FIG. 2. Basically there are two procedures for correcting and detecting errors in the data and faults in the circuitry. The first is less complicated and attempted first. If it fails, and depending on the signals it generates, the second procedure will be called for.

PROCEDURE 1

In both procedures 1 and 2, it is assumed that a fault in a memory storage element or in a correction circuit element results in its being stuck in the binary zero state or in the binary one state, and that all errors in the data word are the result of a fault in a bit component. However, all faults do not necessarily produce an error. For example, a given memory bit storage element could be stuck at zero. If the datum bit stored there is intended to be a binary zero, no error will occur in that datum bit. This will be referred to in subsequent explanations as a "datum compatible fault".

Procedure 1 is capable of detecting and correcting one error in the data word, independent of the number of faults in the memory. It follows necessarily that the faults in excess of one, if they exist, are data compatible faults. Procedure 1 will also correct and detect two errors produced by only two faults.

Errors in excess of two will be detected and signalled, as will two errors accompanied by three or more faults.

DESCRIPTION OF BLOCK DIAGRAM

With reference to FIG. 1, in procedure 1 the data word is read into register A and the MDR. From register A the syndromes are generated in the syndrome generator 11, which implements the parity check matrix hereinabove set forth. The byte parity bits are produced in the byte parity generator 20, also in accordance with the relationships hereinabove set forth, and entered into the MDR along with the memory word. Each of the byte parity bits is exclusively ORed with the corresponding byte of information bits in the byte parity check circuit 21, and their outputs ORed in OR22 to yield R. The syndromes, of which there are seven in the instant code, are ORed in OR16 to produce E.

The combinations of E and R are tested as follows:

$\bar{E}\bar{R}$ = word is OK; all syndromes are zero ($\bar{E}$) and the byte parity is even ($\bar{R}$). The word is read out of the MDR.

$\bar{E}R$ = stop; all syndromes are zero and the byte parity is odd. This is an uncorrectable situation.

$E$ = error; R is assumed to be present. Attempt correction.

The seven syndromes produced by the syndrome generator 11 are stored in seven latches 12 and entered into the syndrome matrix 13. The syndrome matrix consists of 39 AND gates, each of which has 7 inputs consisting of the presence and absence of the syndromes which are affected by each of the 39 bits of the data word. These are derived from the equations hereinabove set forth. For example, datum bit 15 is included in the derivation of syndromes $S_2$, $S_4$, and $S_6$. Therefore the syndrome matrix 13 would logically AND $S_2$, $S_4$, $S_6$, $\bar{S}_1$, $\bar{S}_3$, $\bar{S}_5$, and $\bar{S}_7$ for the datum bit 15. Other unique combinations are constructed for all other bits, including the check bits. It will be noted that all of the information bits, except bit $d_{32}$, are a component of 3 different syndromes. Therefore each of these information bits will have three syndromes present and four absent in the syndrome matrix 13. Bit $d_{32}$ will have five syndromes present and two absent. Each of the check bits will have one presence and four absences of syndromes in the matrix combination.

It will be further noted that a single error will produce only one unique combination of syndromes satisfying the requisite AND combination. Multiple errors will destroy the relationship.

The outputs (there are 39) from the syndrome matrix 13 are entered into the correction circuit 14 along with the 39 bits from the MDR. Each data bit is XORed (exclusively ORed) with a corresponding AND output from syndrome matrix 13. If a single error is present one AND will yield an output, which, when XORed with the corresponding datum bit will complement it and reenter it in register A and into the MDR via register A.

The word as attempted to be corrected now generates its syndromes and byte parity bits. If a single error had been present, correction will have taken place. No correction would have been effected for multiple errors.

The "corrected" word is now tested as follows:

$\bar{E}\bar{R}$ = word OK; read out of the MDR. The single error had been corrected.

$GE$ = stop; there is still an error and the syndrome parity is odd indicating an odd number of errors greater than 1.

$\overline{ER}$ = stop; all syndromes are zero and the byte parity is odd.

$E\overline{G}$ = proceed to double error correction; there is an error ($E$=some syndromes are non-zero), and the number of non-zeros is even ($\overline{G}$).

The apparatus next complements the contents of register A and seeks to enter this complement into memory. If faulty bit positions are present in memory they will refuse to be complemented and retain the status of the original data word. The "complemented" word is read back into register A and compared in the equal's circuit 18 with the contents of the MDR, which contains the original data word, assuming no circuit malfunctions.

Equals circuit 18 compares each bit in register A with the corresponding bit in the MDR and produces a 1 output if they agree, and a 0 if they disagree. This will detect both faults and errors, even if the faults do not produce corresponding errors. The sequence of 39 1's and 0's, constituting a new code word are tested for their syndromes as follows:

$\overline{GE}$ = stop; this is a no error indication, and an error must have occurred to proceed to this stage.

$G\overline{E}$ = stop; there is an error (E) with an odd number of faults, in excess of one.

$G\overline{E}$ = stop; no syndromes signalled (E) but at least one is non-zero (G), an inconsistent situation.

$E\overline{G}$ = an even number of syndromes are at 1. Attempt double error correction.

The double error correction XOR's the "equals" word with each of the bits in the MDR and enters it into register A (via register C) and from there into the MDR. The contents of register A and the MDR are again tested using combinations of E and R as follows.

$\overline{ER}$ = use the word as is; it has been corrected $\overline{ER}$ = stop; word has not been corrected $E$ = stop; word has not been corrected If one selects a four fault two error situation, he can readily understand the foregoing operation. The two errors will preclude single error correction so that the original word will be unchanged after that attempt. The attempted complementing will produce no change in the four stuck bit positions. Comparison in the equals circuit will yield four 1's in the stuck positions. These four 1's will produce an even number of syndromes in the one state. Thus G will be equal to zero, and E equal to one yielding $E\overline{G}$.

When these four 1's are XORed with their corresponding bits, two of those bits will be correctly complemented, and two (in the datum compatible stuck bit positions) will be incorrectly complemented. The resulting word will have two new errors. Testing of this word will yield an error stop.

PROCEDURE 2

Since procedure 2 will refuse to attempt to correct certain of the combinations of faults and errors which may be erroneously corrected by procedure 1 it is a more fault secure system and is reserved for memories known by experience to be fault prone.

Basically the system employs two correction channels working essentially in parallel. The words, as attempted to be corrected in the two channels are compared and permitted to be passed on to the processor only if the words as corrected agree. These two channels employ the same basic correction routines of developing syndromes, using them to correct errors, complementing the bits, comparing them, and using the comparison to complement the faulty bit positions, but alters the sequence in which the routines are performed. In addition, a more sophisticated analysis is performed wherein the characteristics of the syndromes developed during successive stages of the various correction routines are logically examined to obtain greater information as to the nature of the faults and errors.

Specifically, and again with reference to FIG. 1, the memory word is read into register A and from there into the MDR. The syndromes are generated and latched. The syndromes and byte check bit parity are first analyzed as in procedure 1, as follows:

$\overline{ER}$ = use the word as is $\overline{ER}$ = error stop $E$ = proceed to correct The first attempted correction seeks to enter the complement of the original word in register A into memory and the "complement" back into register A. This is then compared in equals circuit 18 and the 1's and 0's thus developed entered into register A, via register C. The syndromes of this "equals" word produce a new G (the parity of the syndromes). The previous G generated by the original word was stored as an H or $\overline{H}$. The eight combinations of G, E, and H are now tested as follows:

$\overline{GE}\overline{H}$ = error stop, greater than 3 faults together with two errors. The $\overline{H}$ signifies an even number of errors in the original word. The $\overline{G}$ signifies an even number of syndromes, in the "equals" word and the $\overline{E}$ signifies no syndromes in the "equals" word.

$\overline{G}EH$ = error stop; greater than 3 faults $\overline{GE}H$ = even number of faults and errors; proceed to correct $\overline{G}E\overline{H}$ = odd number of errors, even number of faults; proceed.

$G\overline{E}\overline{H}$ = error stop; circuit failure. An even number of errors in the original word, and an odd number of faults, with no syndromes in the one state. This is an impossible error-fault combination.

$G\overline{E}H$ = error stop; circuit failure. The $\overline{E}$ (no syndromes) cannot exist with the G signal signifying an odd number of syndromes.

$GE\overline{H}$ = error stop; three or more faults; have even number of errors in original word and odd number of faults (or errors) in equals word.

$GEH$ = proceed to correction; odd number of errors in original word and odd number of faults (or errors) in equals word.

Proceeding first with the $\overline{GE}H$ situation, signifying an even number of errors in the original word and an even number of faults, or errors, in the equals word, the equals word with 1's in the faulty bit positions is XORed in XOR 17 with the original data word from the MDR and entered via register C into register A and thence to the MDR. The syndrome bits of this new word are latched in latches 12, and the syndrome matrix 13 and correction circuit 14 used in a further attempt to correct the word. This "twice corrected" word is then tested for $\overline{ER}$=stop; $E$=stop; and $\overline{ER}$=use data.

The foregoing correction sub-cycle is primarily designed for double errors caused by double faults. It will also work for four errors and four faults.

The $\overline{GE}\overline{H}$ and $GEH$ fault error situations, previously referred to, both initiate the same sub-cycle different from the one just described. The $\overline{GE}\overline{H}$ analysis detects an odd number of errors in the original word and an even number of faults. In the simplest case this would result from two faults, one of which is datum compatible, causing a single error. The case of four faults and three errors will not be corrected, as it could result in a false correction.

If a $\overline{GEH}$ or GEH test results, the equals word with 1's in the faulty bit positions is XORed with the original data word from the MDR and entered into register A (via register C) and into the MDR. The syndrome bits are latched into latches 12, and the syndrome matrix 13 is ready for readout. The output of the syndrome matrix 13 feeds the correction circuits 14 to further correct the word, if only a single fault is present. Multiple faults will not effect any correction by means of the syndromes.

The thus corrected word is then tested for the presence of an error (presence of syndromes) or odd byte parity. If either is present an error stop signal is generated. If a no error and even byte parity is signalled, the resultant word is compared with the word corrected in a parallel correction channel. If comparison results, the word is read out.

The parallel correction channel operates in interspersed fashion with the operations just described. It receives the original data word from the MDR (via register B) and with the word in the MDR and register A develops syndromes which are employed in a further attempted correction. The corrected word is tested for the presence or absence of an error and for add or even byte parity. If $\overline{ER}$ results (no error, even byte parity), the word is compared with the word resulting from processing in the first channel. If equal, the word is passed out to the processor.

In summary, procedure 2 passes on words having no errors immediately following a test, independent of the number of faults that may exist in the memory. The faults, if they exist are not detected. A single fault and single error situation processes the word through the parallel channels, checks both corrections, compares the results and passes the word on only if both checks are successful and the corrected words from both channels agree. Two faults resulting in one error are processed in the same fashion, and are corrected.

Three faults resulting in one error are not corrected, as they could result in a certain percentage of miscorrections. If, in fact, there were only one error the correction could be performed in the parallel correction channel as the syndromes for the single error would be unique. However, the complementing in the first channel will correct the error bit, but incorrectly complement the bits in the data compatible faulty bit positions. These two positions will not generate the requisite syndrome combinations to perform multiple corrections. All single errors resulting from more than two faults will be prevented from being corrected in cycle 2, although all can be corrected in cycle 1.

Double errors resulting from two or four faults will be corrected, because the test satisfies the condition $\overline{GEH}$ which employs the complement type of correction without use of the parallel channel correction and check sub-cycle.

The foregoing summary of operation will now be described in detail with reference to FIGS. 2A through 2N which includes timing means and gates for controlling the sequential operations of the apparatus shown schematically in FIG. 1.

DETAILED DESCRIPTION OF THE DRAWINGS

FIG. 2B shows, at the top of the sheet, a memory which can be accessed by either a "read" or "write" signal. A memory address register is needed but it is now shown on FIG. 2B. When the memory is performing a read operation, it first produces a signal on wire 166 which passes through OR circuit 168 and resets register A to all zeros. The memory then produces the pattern of 1's which is contained in the memory word on cable 170 and loads this pattern of 1's into register A.

On a write operation, if it is desired to write the true word contained in register A, into the memory, flipflop 106 (FIG. 2B) is set to its 0 state which enables gate 178. The true word which is contained on cable 176 will then pass through gate 178 to the memory. If it is desired to write the complement of the word in register A, flip-flop 106 is set to its 1 state in order to enable gate 174. In this case, the complement of the number in register A is contained in cable 172 which extends through gate 168 and goes into the memory.

The pulse generator for the sequencing of procedures involved is shown in FIGS. 2O and 2P. The various pulses produced by this pulse generator are directed into a cable which branches into two cables and extends upwardly at the lower left corner of FIG. 2O. Many of these pulses are applied to OR circuits at the left of FIG. 2O. The outputs of these OR circuits again extend upwardly on FIGS. 2O and 2M and go back into the main control cable which extends upwardly at the left of FIG. 2M. As can be seen on the diagram, this control cable extends to the left along the bottom of FIGS. 2I, 2H and 2G upwardly along the left of FIG. 2G, upwardly along the left of FIG. 2A and horizontally along the top of FIG. 2A. This same control cable also extends horizontally along the bottom of FIGS. 2I and 2J, upwardly along the left side of FIG. 2K and then extends horizontally through FIG. 2L where it ends. In this manner, all control pulses are directed to the proper gates and flip-flops on the wiring diagram.

PROCEDURE I

To accomplish procedure 1, the computer loads the memory address register for the memory and applies an external signal to wire 180 on FIG. 2A which passes through OR circuit 182 to provide a read access of the memory. As explained previously, the desired word will be loaded into register A via cable 170 (FIG. 2B). The computer, at the same time, applies an external signal to wire 184 on FIG. 2O which is applied to the DELAY circuit 186. When the word is loaded into register A on FIGS. 2A and 2B, the DELAY circuit 186 on FIG. 2O will have an output to turn "on" single shot t1. On FIG. 2O, the $t1$ pulse extends through OR circuit 188 to line 140 which extends to FIGS. 2G and 2H and resets the register MDR. On FIG. 2M, the t1 pulse is used to reset the F flipflop to its 0 state.

On FIG. 2P, when single shot $t_1$ goes "off", a pulse is transmitted through OR circuit 190 to turn on single shot $t_2$. On FIG. 2O, then $t_2$ pulse extends through OR circuit 192 to wire 142 which extends to FIG. 2G and is applied to OR circuit 194. OR circuit 194 then has an output which is applied to GATE Z (FIG. 2H) in order to load the register MDR On FIGS. 2G and 2H. On FIG. 2G, it will be noted that wire 142 branches and extends via FIG. 2I to FIG. 2G where it is applied to GATE X in order to latch the S bits in the latches generally designated as 196.

On FIG 2P, when single shot t2 goes off, a pulse is produced to turn on single shot t3. The t3 pulse is used to test gate 100 on FIG. 2M. If the input labelled $\overline{ER}$ is active, a pulse will extend through OR circuit 198 (FIG. 2N) then through OR circuit 200 on FIG. 2J to gate 202 on FIG. 2I in order to gate the MDR to the PROCESSOR. If the input labelled ER is active, a pulse will extend to the wire labelled ER on FIG. 2N which indicates "error, stop". If the input labelled FE ($F=0$ at this time) is active, a signal will extend to the wire labelled FE on FIG. 2N which indicates a "stop, send storage error signal." If the input labelled $\overline{FE}$ is active, a pulse will extend to turn on single shot t4. On FIG. 2O, the t4 pulse extends through OR circuit 204 to wire 154 which extends to FIG. 2B and passes through OR circuit 168 to reset register A.

On FIG. and 2P, when single shot t4 turns off, a pulse is produced to turn on single shot t5. The t5 pulse extends through OR circuit 207 to wire 144 (FIG. 2O) which extends to FIG. 2L where it is applied to GATE Y in order to gate the output of the correction circuit to register A.

On FIG. 2P, when single shot t5 turns off, a pulse is produced to turn on single shot t6. The t6 pulse extends through OR circuit 188 (FIG. 2O) to wire 140 which extends to FIGS. 2G and 2H where the pulse resets the register MDR.

On FIG. 2P, when single shot t6 turns off, a pulse is produced to turn on single shot t7. The t7 pulse extends to FIG. 2G where it passes through OR circuit 194 to GATE Z (FIG. 2H) in order to load register MDR.

On FIG. 2P, when single shot t7 turns off, a pulse is produced to turn on single shot t8. On FIG. 2M, the t8 pulse is used to test GATE 104. If the input labelled $\overline{ER}$ is present, a pulse will be transmitted through OR circuit 198 (FIG. 2N), OR circuit 200 on FIG. 2J to gate 202 (FIG. 2I) in order to gate the contents of the register MDR to the processor. If the input labelled GE is present, a pulse will be transmitted to the wire labelled GE on FIG. 2N which indicates "send storage error signal halt." If the input labelled ER is present, a pulse will be transmitted to the wire labelled ER on FIG. 2N which indicates "error, stop." If the input labelled $\overline{FEG}$ is present, a pulse will be transmitted to turn on single shot t1 (FIG. 2O).

The tt1 pulse extends through OR circuit 206 (FIG. 2O) to line 160 which extends to FIG. 2B where the pulse is used to set flip-flop 106 to its 1 state. On FIG. 2O, when single shot tt1 turns off, a pulse is produced which turns on single shot tt2.

The tt2 pulse extends through OR circuit 208 (FIG. 2O) to wire 146 which extends to FIG. 2B where the pulse is used to provide a write access to the memory. Because flip-flop 106 is in its 1 state, the complement of the number in register A will be written into the memory.

On FIG. 2O, the tt3 pulse is next produced which passes through OR circuit 210 (FIG. 2O) to wire 148 which extends to FIG. 2A and where the pulse passes through OR circuit 182 to provide a read access for the memory. Also, on FIG. 2O, the tt3 pulse passes through OR circuit 212 to wire 150 which extends to FIGS. 2K and 2L and provides a reset for register C.

On FIG. 2P, the tt4 pulse is next produced. This pulse passes through OR circuit 214 (FIG. 2O) to wire 152 which extends to FIG. 2I and is applied to gate 108 in order to gate register A to one side of the equals circuits shown on FIGS. 2I, 2J and 2K. Also, on FIG. 2I, the pulse on wire 152 is applied to gate 110 in order to gate the MDR to the other side of the same equals circuit. On FIG. 2L, the delayed pulse on wire 152 is applied to gate 112 in order to gate the outputs of these equals circuits to register C.

On FIG. 2P, the tt5 pulse is next produced. This pulse passes through OR circuit 204 (FIG. 2O) to wire 154 which extends to FIG. 2B and passes through OR circuit 168 to reset register A.

On FIG. 2P, the tt6 pulse is next produced. This pulse passes through OR circuit 216 (FIG. 2O) to wire 156 which extends to FIG. 2L and where the pulse is applied to gate 114 in order to gate the contents of register C to register A.

On FIG. 2P, the tt7 pulse is next produced. This pulse passes through OR circuit 212 (FIG. 2O) to wire 150 which extends to FIG. 2K and where the pulse is used to reset register C. On FIG. 2M, the tt7 pulse is also used to test GATE 116. If the input $\overline{GE}$ is present, a pulse will extend to the wire labelled $\overline{GE}$ on FIG. 2N and where it indicates a "storage failure, stop." If the input labelled GE is active, a pulse will extend to the wire labelled GE on FIG. 2N which indicates "send storage error signal halt." If the input labelled $\overline{GE}$ is present, a pulse will extend to the wire labelled $\overline{GE}$ on FIG. 2N which indicates "circuit failure, stop." If the input labelled $\overline{EG}$ is present, a pulse will extend to turn on single shot tt8.

On FIG. 2M, the tt8 pulse is used to set flip-flop F to its 1 state. On FIG. 2O, the tt8 pulse passes through OR circuit 218 to wire 158. On FIG. 2I, the pulse on wire 158 is applied to gate 118 in order to gate register A to one side of the "exclusive OR" circuits shown near the bottom of FIGS. 2I, 2J and 2K. Also, on FIG. 2I, the pulse on wire 158 is applied to gate 120 in order to gate the MDR to the other side of the same "exclusive OR" circuits. On FIG. 2L, the delayed pulse on wire 158 is applied to gate 122 in order to gate the outputs of these exclusive OR circuits to register C.

On FIG. 2P, the tt9 pulse is next produced. This pulse passes through OR circuit 188 (FIG. 2O) to wire 140 which extends to FIG. 2G and where the pulse is used to reset the MDR. On FIG. 2O, the 559 pulse passes through OR circuit 204 to wire 154 which extends to FIG. 2B and passes through OR circuit 168 to reset register A.

On FIG. 2P, the tt10 pulse is next produced. This pulse passes through OR circuit 216 (FIG. 2O) to wire 156 which extends to FIG. 2L and where the pulse is applied to gate 114 in order to gate register C to register A.

On FIG. 2P, it will be noted that when single shot tt10 turns off, a pulse is produced which passes through OR circuit 190 to turn on single shot t2. The sequence of pulses from t2 to t8 has been previously described.

PROCEDURE 2

For this procedure, the computer applies an external signal to wire 180 on FIG. 2A and this signal extends through OR circuit 182 to provide a read access of the memory. It is understood that the memory address register is also loaded. At the same time, the computer applies an external signal to wire 220 on FIG. 2O. When the word of the desired address is loaded into register A, on FIGS. 2A and 2B, the DELAY circuit 22 (FIG. 2O) will have an output to turn on single shot tp1. The tp1 pulse extends through OR circuit 188 to wire 140 which extends to FIG. 2G and where the pulse is used to reset the MDR. On FIG. 2O, the tp2 pulse is next produced. This pulse extends through OR circuit 192 to wire 142 which extends to FIGS. 2G and 2C. On FIG. 2C, the pulse is applied to gate X in order to latch the S bits into the register designated as 196. On FIG. 2G, the pulse on wire 142 extends to the OR circuit 194 in order to enable the GATE Z which allows the MDR to be loaded.

On FIG. 2O, the tp3 pulse is next produced. This pulse is applied to gate 124 on FIG. 2M. If the input $\overline{ER}$ is active, a pulse will extend via OR circuit 198 (FIG. 2N) OR circuit 200 (FIG. 2J) to gate 202 (FIG. 2I) in order to gate the MDR to the processor. If the input $\overline{ER}$ is active, a pulse will extend to the wire labelled $\overline{ER}$ on FIG. 2N which indicates error, stop. If the input labelled E is active, a pulse will extend to turn on single shot tp4. The tp4 pulse extends to gate 224 on FIG. 2M in order to gate the G value to the flip-flop H.

On FIG. 2P, the tp5 pulse is next produced. This pulse extends through OR circuit 206 (FIR. 20) to wire 160 which extends to FIG. 2B and allows the pulse on it to set flip-flop 106 to its 1 state.

On FIG. 2P, the next pulse produced in the tp6 pulse. This pulse extends through OR circuit (FIG. 20) to wire 146 which extends to FIG. 2B and, the pulse on it is used to provide a write access of the memory. Because flip-flop 106 (FIG. 2B) is in its 1 state, gate 174 will be enabled and the complement of the number in register A will be written back into the memory. On FIG. 2P, the tp7 pulse is next produced. This pulse extends through OR circuit 210 (FIG. 20) to wire 148 which extends to FIG. 2A where the pulse on it extends through OR circuit 182 to provide a read access of the memory. In this manner, the register A is again loaded. The tp7 pulse also extends through OR circuit 212 on FIG. 20 to line 150 which extends to FIG. 2K where the pulse on it is used to reset register C.

On FIG. 2P, the tp8 pulse is next produced. This pulse extends through OR circuit 214 (FIG. 20) to wire 152 which extends to FIG. 2I where the pulse on it is applied to gate 108 in order to gate register A to one side of the equals circuits. The pulse on wire 152 is also applied to gate 110 (FIG. 20) which gates the MDR to the other side of the same equals circuits. Wire 152 also extends to FIG. 2L where the delayed pulse on it is applied to gate 112 in order to gate the outputs of these equals circuits to register C.

On FIG. 2P, the tp9 pulse is next produced. This pulse extends through OR circuit 204 on FIG. 20 to wire 154 which extends to FIG. 2B where the pulse on it passes through OR circuit 168 to reset register A. On FIG. 2P, the next pulse produced is the tp10 pulse. This pulse passes through OR circuit 216 (FIG. 20) to wire 156 which extends to FIG. 2L and where the pulse on it is applied to gate 114 in order to gate register C to register A.

On FIG. 2P, the tp11 pulse is next produced which, on FIG. 2N, is applied to gate 126. It will be noted that gate 126 has eight inputs, only one of which can be active at any one time. The active state of five of the inputs extends to FIG. 2N and indicates errors. If either of the two inputs $\overline{GEH}$ or GEH are active, OR circuit 226 on FIG. 2N will have an output which will turn on single shot tp20. If the input labelled $\overline{GEH}$ is active, a pulse will be produced which will turn on single shot tp12. The tp12 pulse passes through OR circuit 212 to wire 150 which extends to FIG. 2K where the pulse on it is used to reset register C.

On FIG. 2P, the tp13 pulse is next produced. This pulse passes through OR circuit 218 (FIG. 20) to wire 158 which extends to FIG. 2I where the pulse on it is applied to gate 118 in order to gate register A to one side of the exclusive OR circuits on the lower part of FIGS. 2I through 2L.

On FIG. 2I, wire 158 also extends to gate 120 where the pulse on it is effective to gate the MDR to the other side of the same exclusive OR circuits. On FIG. 2L, the wire 158 extends to gate 122 where the delayed pulse on it is used to gate the outputs of the exclusive OR circuits to the register C.

On FIG. 2P, the tp14 pulse is next produced. This pulse passes through OR ciecuit 204 on FIG. 20 to wire 154 which extends to FIG. 2B and where the pulse on it passes through OR circuit 168 to reset register A.

The next pulse produced is tp15. This pulse passes through OR circuit 216 on FIG. 20 to wire 156 which extends to FIG. 2J where the pulse on it is applied to gate 114 in order to gate register C to register A. The tp15 pulse also passes through OR circuit 188 (FIG. 20) to wire 140 which extends to FIGS. 2H and 2C. On FIG. 2H, the pulse on this wire extends through OR circuit 194 to GATE Z in order to load the MDR. On FIG. 2C, the pulse on wire 142 is applied to GATE X which latches the S bits into the flip-flops 196.

The tp17 pulse is next produced. This pulse passes through OR circuit 204 on FIG. 20 to wire 154 which extends to FIG. 2B and where the pulse on it extends through OR circuit to reset register A.

The next pulse produced is tp. This pulse passes through OR circuit 207 (FIg. 20) to wire 144 which extends to FIG. 2L and where the pulse on it is applied to GATE Y in order to gate the output of the correction circuits to register A. The next pulse produced is the tp19 pulse which, on FIG. 2M is applied to gate 128. If the input labelled $\overline{ER}$ is active, a pulse will be produced which extends via OR circuit 198 (FIG. 2N), and OR circuit 200 (FIG. 2J) to gate 202 in order to gate the MDR to the processor. If the input labelled $\overline{ER}$ is active, a pulse will extend to the line on FIG. 2N labelled $\overline{ER}$ which indicates error, stop. If the input labelled E is active, a pulse will extend to the line labelled E on FIG. 2N which indicates "error halt, give signal to CPU."

On FIG. 2P, the next pulse which will be explained is the tp20 pulse. This pulse extends through OR circuit 228 (FIG. 20) to wire 162 which extends to FIGS. 2K and 2L and where the pulse on it is used to reset register B. This same pulse also extends through OR circuit 212 (FIG. 20) to wire 150 which extends to FIGS. 2K and 2L and where the pulse on it is used to reset register C.

On FIG. 2P, the next pulse produced is the tp21 pulse. This pulse extends through OR circuit 218 (GIG. 20) to wire 158 which extends to FIG. 2I and where the pulse on it is applied to gate 118 in order to gate the register A to one side of the exclusive OR circuits. On FIG. 2I, the pulse on wire 158 is also applied to gate 120 in order to gate the MDR to the other side of the exclusive OR circuits. On FIG. 2L, the delayed pulse on wire 158 is applied to gate 122 in order to gate the outputs of the exclusive OR circuits to register C.

On FIG. 2P, the next pulse produced is the tp22 pulse. This pulse extends through OR circuit 204 (FIG. 20) to wire 154 which extends to FIG. 2B and where the pulse on it extends through OR circuit 168 to reset register A.

The tp23 pulse is next produced. This pulse extends through OR circuit 216 (FIG. 20) to wire 156 which extends to FIG. 2L and where the pulse on it is applied to gate 114 in order to gate register C to register A. The tp23 pulse also extends through OR circuit 230 (FIG. 20) to wire 164 which extends to FIG. 2K and where the pulse on it is used in gate 132 to gate the MDR to the register B.

The next pulse produced is the tp24 pulse. This pulse extends through OR circuit 188 (FIG. 20) to wire 140 which extends to FIGS. 2G and 2H and where the pulse on it is used to reset the MDR.

The next pulse produced is the tp25 pulse. This pulse extends through OR circuit 192 (FIG. 20) to wire 142 which extends to FIG. 2H where the pulse on it passes through OR circuit 194 to gate Z in order to load the MDR. Wire 142 also extends to FIG. 2C where the pulse on it is applied to Gate X in order to latch the S bits into the register designated by the reference character 196. On FIG. 20, the next pulse produced is the tp26 pulse. This pulse passes through OR circuit 204 (FIG. 20) to wire 154 which extends to FIG. 2B and where the pulse on it passes through OR circuit 168 to reset register A.

The next pulse produced is the tp27 pulse. This pulse passes through OR circuit 207 (FIG. 20) to wire 144 which extends to FIG. 2L and where the pulse on it is used to gate the output of the correction circuit to register A.

The next pulse produced is the tp28 pulse. On FIg. 20, this pulse is applied to OR circuit 188 and wire 140 to reset the NOR. Pulse tp29, next produced, acting through OR gate 192 (FIg. 20) wire 142 and OR gate 194 opens gate Z to gate the contents of register A to the MDR. It also latches the S bits in latches 196.

The tp30 pulse opens test gate 130 (FIG. 2M) to test for EVR or $\overline{ER}$. If E or R is present, an error stop signal is produced on FIG. 2N. An $\overline{ER}$ output is passed to FIG. 20 to turn on single shot tp31.

Pulse tp31, acting through OR gate 204 (FIG. 20) and wire 154 resets register A (FIG. 2B) via OR gate 168 and actuates single shot tp32. This tp32 pulse (FIG. 2P) enters the cable and exits therefrom on FIG. 2K to open gate G to gate the contents of register B to register A, also turning on single shot tp33.

Pulse tp33 (FIG. 2P) enters the cable and exits on FIG. 20 to actuate OR gate 228 and wire 162 to reset register B (FIGS. 2K and 2L). Pulse tp33 also fires single shot tp34. Pulse tp34 activates OR gate 230 and wire 164 to open gate 132 (FIG. 2K) to gate the contents of the MDR to register B. Pulse tp34 fires single shot tp35 to produce that timing pulse, which activates OR gate 188a (FIG. 20) and wire 140 to reset the MDR (FIGS. 2G and 2H).

Pulse tp35 fires the next single shot and produces tp36 which activates OR gate 192a (FIG. 20) and wire 142 to open gate 2 (via OR 194) to enter the contents from register A into the MDR. It also latches S bits in latches 196 (FIG. 2C).

Pulse tp37, which follows tp36, enters OR 204 (FIG. 20) and pulses wire 154 to reset register A via OR 168 (FIG. 2B). Pulse tp38, which next follows, operates OR 207 (FIG. 20) nad pulses wire 144 to open gate Y (FIG. 2L) to gate the output of the correction circuits to register A.

Pulse tp39, produced upon cessation of tp38, activates OR 188a (FIG. 20) and wire 140 which, on FIGS. 2G and 2H, resets the MDR. Cessation of tp39 activates the tp40 single shot. Pulse tp40 operates OR 192a (FIG. 20) to pulse wire 142, which on FIG. 2G provides, via OR 194, the impulse to open gate Z (FIG. 2H) to enter the contents of register A into the MDR. Pulse tp40 also latches the S bits.

At tp41 time, the contents of register A and the MDR are tested by means of the byte parity and syndromes by means of gate 136 (FIG. 2M). If E or R is present, a signal output is produced on FIG. 2N, labelled "EVR error, stop." If an $\overline{ER}$ signal is produced, tp42 single shot (FIG. 2P) is fired. The resulting impulse opens gate 234 to allow the compare circuit outputs = (equal) or $\neq$ (not equal) to be gated out. Compare circuit 236 compares the contents of register B and the MDR.

If the $\neq$ signal is produced, an error stop signal is outputted on FIG. 2N. If the = signal is generated, OR 200 (FIG. 2J) is activated to open gate 202 (FIG. 2I) to gate the contents of the MDR to the data processor.

From the foregoing detailed description and that relating to the schematic of FIG. 1, it will be seen that the detection and correction apparatus employs two basic means of correction, namely using the syndrome bits for single error correction, and the comparison of the word complements to produce a fault location word which is XORed with the original data word for double error correction. The testing of the data word as originally stored and as attempted to be corrected relies on syndrome analysis and byte parity checks and combinations thereof. The parallel correction channels with different correction sequences provides greater system security by preventing miscorrection of words. All of these operations are performed with an error correcting code having small redundancy.

While the invention has been particularly shown and described with reference to a preferred embodiment, it will be understood by those skilled in the art that various changes in form and detail may be made therein without departing from the spirit of the invention.

What is claimed is:

1. Apparatus for detecting faults in a memory storing a data word consisting of information bits and check bits encoded in an error correcting code, for detecting errors caused by said faults, and for correcting certain of said errors and preventing the miscorrections of others, comprising;

a first and a second correction channel, each of which is operative to receive said data word from memory and to attempt to correct it utilizing different sequences of error-correction operations in each channel;

means including registers and a comparator for receiving the attempted-to-be-corrected word from each of said channels and comparing said words as received, to produce an equal or unequal signal; and means responsive to an equal signal for gating out one of said attemtped-to-be-corrected words from one of said registers for utilization as a valid code word.

2. The apparatus of claim 1 wherein said first channel comprises first and second error correction circuitry, said first error correction circuitry being connected to receive said data word from memory and operative to attempt to correct said data word by a first predetermined sequence of operations, said second error correction circuitry being connected to said first error correction circuitry and operative to receive the word as sought to be corrected by first error correction circuitry and to further attempt to correct the word as received by a second predetermined sequence of operations different from said first sequence of operations.

3. The apparatus of claim 1 wherein said second channel comprises second error correction circuitry operative to receive said data word from memory and to attempt to correct said word by a second predetermined sequence of operations.

4. The apparatus of claim 2 wherein said second error correction circuitry is used in both said channels at different times, and timing means operatively connected to said second error correction circuitry to connect said second error correction circuitry to said memory to receive said data word and to control said circuitry to operate in accordance with said second predetermined sequence of operations in said second channel, said timing means being further operative to connect said second error correction circuitry to said first error control circuitry in said first channel and control said second error control circuitry to operate in accordance with said second predetermined sequence of operations at a cycle different from its operation in said first channel.

5. The apparatus of claim 2 wherein said first error correction circuitry comprises;
 a first register operative to receive said data word from memory;
 a second register operative to receive said data word from said first register;
 means in said first register for complementing the data word stored therein;
 means for presenting said word as complemented in said first register for entry into said memory;
 means for re-entering the complemented word as actually entered in memory into said first register;
 means for comparing each bit of the last-named content of said first register with the corresponding bit of the original data word as stored in said second register and producing therefrom a fault location word having zeros in all non-comparing bit positions and ones in all comparing bit positions, whereby the ones manifest those memory bit positions having faults therein;
 c an exclusive OR gate for each bit position, each having as an input one bit from said fault location word from said first register and a corresponding bit from the original data word from said second register, and having as outputs the complemented bits of the original data only in those bit positions having a one in the fault location word; and
 register means for receiving the word as sought to be thus corrected.

6. The apparatus of claim 2 wherein said second error correction circuitry comprises,
 first register means operative to receive said data word from memory;
 syndrome generating means under control of said first register for generating a plurality of syndrome bits, each of which is the modulo two sum of different predetermined combinations of the bits in said first register;
 correction bit generating means including a plurality of AND gates each having as inputs a different predetermined combination of syndrome bits, whereby each AND gate will yield an output for a single error in its corresponding bit position, and
 a plurality of exclusive OR gates, each having as inputs the output of an AND gate and the corresponding bit of the original data word stored in said second register, whereby a single error in said original data word will be corrected.

7. In the apparatus of claim 6, first error symbol generating apparatus, comprising;
 means under control of said first register for generating byte parity bits, each of which is the modulo two sum of predetermined combinations of bits in said first register;
 means for obtaining the modulo two sum of each of said byte parity bits and a corresponding byte of bits stored in said second register and registering for each a binary zero or binary one; and
 logical OR means for producing an output signal R if any one of said modulo two sums is one and a $\overline{R}$ signal if all said modulo two sums are zero.

8. In the apparatus of claim 6 second error symbol generating means, comprising;
 an OR gate having as inputs thereto said syndrome bits, operative to produce a E error symbol if any syndrome bit is non-zero, and a $\overline{E}$ symbol if all syndrome bits are zero;
 an exclusive OR tree operative responsive to said syndrome bits to produce a $\overline{G}$ symbol if the number of non-zero syndromes is even, and a G symbol if the number of non-zero syndromes is odd.

9. In the apparatus of claim 8 means for testing the contents of said first and said second registers, comprising;
 means operative when said first and said second registers contain said original data word for combining the outputs of said first and said second error symbol generating means and obtaining signals manifestative of the combinations $\overline{ER}$, $\overline{E}R$, or E;
 means responsive to a $\overline{E}R$ signal for gating out the contents of said second register as an error-free word for further processing;
 means responsive to a $\overline{E}R$ signal for stopping further operation and signalling an error stop;
 means responsive to an E signal for initiating operation of said first correction circuitry in said first channel; and
 means for storing the G or $\overline{G}$ signal derived from said original data, as H or $\overline{H}$ respectively.

10. In the apparatus of claim 9 means for checking said first error correction operation, comprising;
 means operative when said first register contains said fault location word for activating said second error symbol generating apparatus to generate E, $\overline{E}$, G or $\overline{G}$ as a function of the bit content of said fault location word;
 means for combining the output of said second error symbol generating apparatus with the output of said means storing H or $\overline{H}$ in the following combinations;

| (1) | $\overline{GEH}$ | (5) | $GE\overline{H}$ |
| (2) | $\overline{GE}H$ | (6) | $\overline{G}E\overline{H}$ |
| (3) | $G\overline{EH}$ | (7) | $\overline{G}EH$ |
| (4) | $G\overline{E}H$ | (8) | $GEH$ | means responsive to any one of the combinations of error symbols (1) through (5) for stopping operation and signalling an error;

means responsive to a $\overline{GEH}$ signal for continuing the error correction operation in said first channel; and means responsive to a $\overline{GEH}$ or a GEH signal for continuing the operation in said first channel and initiating the operation in said second channel.

11. In the apparatus of claim 10;

means operative in response to said $\overline{GEH}$ signal when said first register contains the output of said first correction circuitry for generating syndrome bits as a function of the contents thereof;

means for activating said first correction circuitry for attempting to correct the contents of said second register as a function of the last generated syndromes; and means for activating said first and said second error symbol generating means to produce E, $\overline{E}$, R, or $\overline{R}$ error symbols as a function of the bits of the sought-to-be-corrected word;

means responsive to $\overline{ER}$ combination of error symbols for gating out the word as error free; and means responsive to a $\overline{E}$R, or E error symbols for signalling an error and stopping operation.

12. In the apparatus of claim 10, means responsive to said means for checking, comprising;

means responsive to said $\overline{GEH}$ or GEH signals for initiating operation of said first correction apparatus in said first channel and to enter a first word correction attempt into said first and said second registers and to produce a new set of syndrome bits as a function of the contents of said first register;

means for activating said second correction circuitry to operate upon the last entered contents of said second register with the last-produced set of syndromes and to enter the new word in said first and second registers; and means for activating said first and said second error symbol generating means to operate responsive to the last-named contents of both said registers to produce the signals E, $\overline{E}$, R or $\overline{R}$;

means responsive to and E or R signal to stop operation; and means responsive to a $\overline{ER}$ signal for initiating operation of said first correction cycle.

13. In a fault detecting and error correcting apparatus for detecting faults in a memory storing a data word therein, for detecting errors in said data word, for correcting certain of said errors, and preventing the miscorrection of other errors, the said word consisting of N bits of which K bits are check bits encoded in a Hamming SEC/DED code in which the parity check matrix has N columns and K rows and there are an odd number of ones in each column and each row has the same number of ones modulo two, including one for each check bit, apparatus for testing an N-bit word and producing signals manifestive of the nature of the errors therein, comprising;

means for generating K syndrome bits, each of which is the modulo two sum of a different predetermined combination of bits from a data word to be tested, certain of said syndromes being generated from the combinations of A and B where A is a predetermined byte of information bits different for each syndrome and B is the remaining element of the bit combination specific to the given syndrome;

means for generating a plurality, less than K, of byte parity check bits each of which is equal to the modulo two sum of the B combination of bits of a corresponding syndrome having a B component therein;

means for obtaining the modulo two sum of each of said byte parity check bits and its corresponding A byte bits and producing a zero or one parity test signal manifestive of an even or odd parity check of each of the combinations;

means for producing an R signal if any one of said byte parity test signals is non-zero and a $\overline{R}$ signal if all parity test signals are zero;

means for obtaining the modulo two sum of said syndrome bits and producing a $\overline{G}$ signal if said sum is zero and a G signal if said sum is one;

means for producing an E signal if any one of said syndrome bits is non-zero and a $\overline{E}$ signal if all syndrome bits are zero; and means for combining said error signals in the following combinations;

$\overline{ER}$      EG      $\overline{EG}$
$\overline{E}R$      $\overline{E}G$
E      $E\overline{G}$ means responsive to the combinations $\overline{E}R$; EG; $\overline{EG}$; $E\overline{G}$ for discontinuing any error correction and signalling an error; and means responsive to an E or $E\overline{G}$ signal for initiating error correction operations; and means responsive to $\overline{ER}$ signal for reading out the word under test for further use as a valid code word.

14. In the apparatus of claim 13 first correction apparatus comprising;

means for combinatorialy ANDing said syndrome bits and exclusively ORing the thus ANDed combinations with a corresponding bit from said data word, whereby a single error in said data word will be complemented, the combinations of syndromes being so chosen that only one combination can be satisfied for a single error only.

15. In the apparatus of claim 14 means for testing the results of said first correction means, comprising;

means for generating syndrome bits of the word as sought to be corrected by said first correction means;

means for producing signals G or $\overline{G}$ and E or $\overline{E}$ signals as a function of the syndrome bits of that word where G and $\overline{G}$ are odd and even parity of the syndrome bits.

16. Apparatus for performing single error corrections upon a word encoded in a Hamming SEC/DED code having a parity check matrix in which there are the same number of ones in each column, comprising;

means for generating a plurality of syndrome bits, each of which is the modulo two sum of a different combination of bits of said word, the combinations being compatible with the parity check matrix;

a plurality of AND gates one for each bit position of said word;

means for coupling a different combination of said syndrome bits to each of said AND gates whereby one of said AND gates will yield an output for a single error in the corresponding bit position;

a plurality of exclusive OR gates, one for each bit position; and means for combining in each of said exclusive OR gates one of the bits of the word to be corrected and the output of a corresponding AND gate whereby a single bit in error is complemented.

17. Apparatus for performing double error correction upon a word stored in a memory having faults in only those error bit positions, the said word being encoded in a Hamming SEC/DED error correcting code characterized by a parity checked matrix having the same number of ones modulo two in each row and an odd number of ones in each column, comprising;

first register means for receiving the data word as recorded in said memory;

second register means for recording the data word as recorded in said memory;

means under control of said first register for attempting to enter the complement of the contents of said register into memory;

means for re-entering the actual word as sought-to-be-complemented in said memory into said first register;

means for comparing each bit in said first register with each corresponding bit in said second register and producing therefrom a fault location word having ones in the faulty bit positions and zeros in the sound bit positions;

and means for exclusively ORing each bit of said data word in said second register with a corresponding bit of said fault location word to thus complement and correct the two erroneous bits.

* * * * *